United States Patent
Anastassov

(10) Patent No.: US 11,946,769 B2
(45) Date of Patent: Apr. 2, 2024

(54) METHOD, APPARATUS, AND SYSTEM FOR IDENTIFYING SPECIAL AREAS AND CLEANING-UP MAP DATA

(71) Applicant: HERE Global B.V., Eindhoven (NL)

(72) Inventor: Anton Anastassov, Naperville, IL (US)

(73) Assignee: HERE Global B.V., Eindhoven (NL)

( * ) Notice: Subject to any disclaimer, the term of this patent is extended or adjusted under 35 U.S.C. 154(b) by 524 days.

(21) Appl. No.: 17/100,257

(22) Filed: Nov. 20, 2020

(65) Prior Publication Data

US 2022/0163347 A1 May 26, 2022

(51) Int. Cl.
*G06F 16/28* (2019.01)
*G01C 21/00* (2006.01)
(Continued)

(52) U.S. Cl.
CPC ..... *G01C 21/3841* (2020.08); *G01C 21/3815* (2020.08); *G06F 16/215* (2019.01);
(Continued)

(58) Field of Classification Search
CPC ............ G01C 21/3841; G01C 21/3815; G06F 16/215; G06F 16/285; G06F 16/29; G06F 18/232; G06N 20/00; G06V 20/05
See application file for complete search history.

(56) References Cited

U.S. PATENT DOCUMENTS 11,462,019 B2 * 10/2022 Engle ................. G08G 1/202
2012/0083964 A1 * 4/2012 Montemerlo ...... G07C 9/00563
701/25

(Continued)

FOREIGN PATENT DOCUMENTS

DE 102020008065 A1 * 2/2022
EP 3101390 A1 12/2016
(Continued)

OTHER PUBLICATIONS

Klement Sascha, Aug. 24, 2022, English Machine Translation_ DE102020/008065A1 provided by Patent Translate by EPO and Google (Year: 2022).*
(Continued)

*Primary Examiner* — Peter D Nolan
*Assistant Examiner* — Ashley L Redhead, Jr.
(74) *Attorney, Agent, or Firm* — DITTHAVONG, STEINER & MLOTKOWSKI

(57) ABSTRACT

An approach is provided for identifying special areas with significant vehicle activities that do not represent established roads (e.g., construction areas). The approach involves, for example, retrieving probe data collected from sensors of probe devices traveling within a geographic area including geographic partitions. The approach also involves dividing each of the geographic partitions into grid cells. The approach further involves, for each grid cell, detecting directional groupings of the probe data that share a respective common direction of travel. The approach further involves detecting a set of grid cells with a count of the directional groupings that is above a count threshold. The approach further involves designating an area associated with the set of grid cells as an unconstrained area or a sub-area of the unconstrained area. The approach further involves providing the unconstrained area and/or the sub-area as a mapping data output.

20 Claims, 18 Drawing Sheets

(51) Int. Cl.
  *G06F 16/215* (2019.01)
  *G06F 16/29* (2019.01)
  *G06F 18/232* (2023.01)
  *G06N 20/00* (2019.01)
  *G06V 20/58* (2022.01)

(52) U.S. Cl.
  CPC ............ *G06F 16/285* (2019.01); *G06F 16/29* (2019.01); *G06N 20/00* (2019.01); *G06F 18/232* (2023.01); *G06V 20/58* (2022.01)

(56) References Cited

U.S. PATENT DOCUMENTS

| | | | |
|---|---|---|---|
| 2012/0116678 A1* | 5/2012 | Witmer | G06F 16/29 702/5 |
| 2012/0259547 A1 | 10/2012 | Morlock et al. | |
| 2016/0335923 A1* | 11/2016 | Hofmann | G09B 29/004 |
| 2016/0358349 A1* | 12/2016 | Dorum | G06T 11/203 |
| 2018/0025628 A1* | 1/2018 | Ivanov | G01C 21/26 701/117 |
| 2018/0189323 A1 | 7/2018 | Wheeler | |
| 2019/0095514 A1 | 3/2019 | Anastassov | |
| 2020/0298858 A1* | 9/2020 | Stenneth | G08G 1/167 |
| 2020/0327707 A1* | 10/2020 | Furger | G01C 21/32 |
| 2022/0082403 A1* | 3/2022 | Shapira | G01C 21/32 |

FOREIGN PATENT DOCUMENTS

| | | | | |
|---|---|---|---|---|
| EP | 3722753 A | 10/2020 | | |
| WO | 2010129192 A1 | 11/2010 | | |
| WO | WO-2011016819 A1 * | 2/2011 | | G01C 21/30 |
| WO | WO-2011016901 A1 * | 2/2011 | | G01C 21/30 |
| WO | 2017200889 A1 | 11/2017 | | |
| WO | WO-2017200889 A1 * | 11/2017 | | G01C 21/32 |

OTHER PUBLICATIONS

Min Pu, Jun. 10, 2019, "Road Intersection Detection Based on Direction Ratio Statistics Analysis", IEEE, 2019 20th IEEE International Conference on Mobile Data Management (MDM), pp. 288-297, provided by Google (Year: 2019).*
Dørum, "Deriving Double-Digitized Road Network Geometry from ProbeData", SSIGSPATIAL'17, Nov. 7-10, 2017, retrieved on Nov. 20, 2020 from https://www.researchgate.net/profile/Ole_Dorum/publication/327635810_Deriving_Double-Digitized_Road_Network_Geometry_from_Probe_Data/links/5d7becc7299bf1d5a97d5e5c/Deriving-Double-Digitized-Road-Network-Geometry-from-Probe-Data.pdf, 10 pages.
Office Axtion for related European Patent Application No. 21209105.2-1009, dated Sep. 28, 2022, 25 pages.
Fu et al., "Density Adaptive Approach for Generating Road Network From GPS Trajectories", in IEEE Access, vol. 8, Mar. 11, 2020, 12 pages.
Pu et al., "Road Intersection Detection Based on Direction Ratio Statistics Analysis", 2019 20th IEEE International Conference on Mobile Data Management (MDM), 2019, pp. 288-297.
Office Action for related U.S. Appl. No. 17/100,312, dated Sep. 27, 2023, 66 pages.
Office Action for related U.S. Appl. No. 17/100,312, dated Feb. 8, 2023, 50 pages.

* cited by examiner

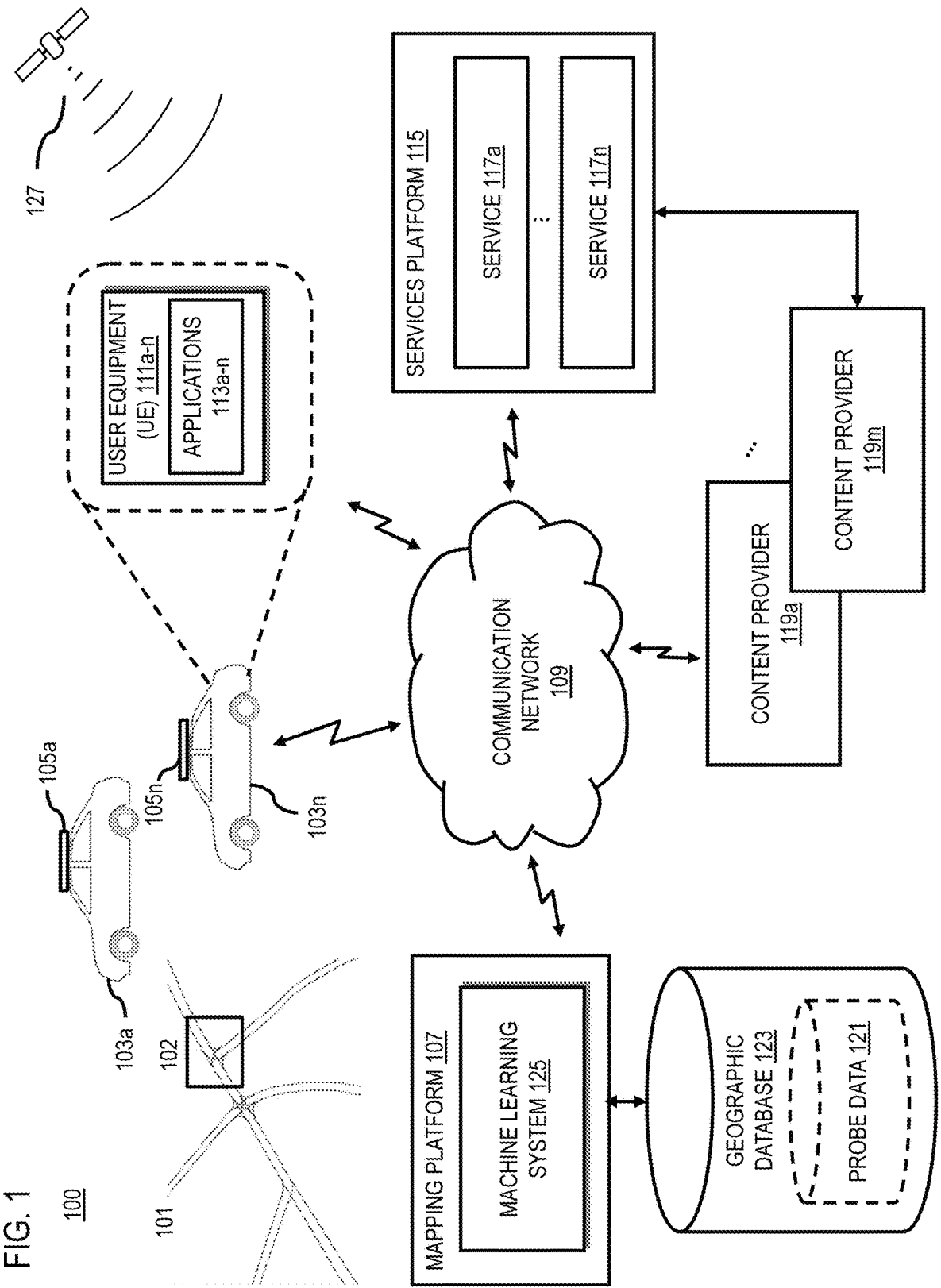

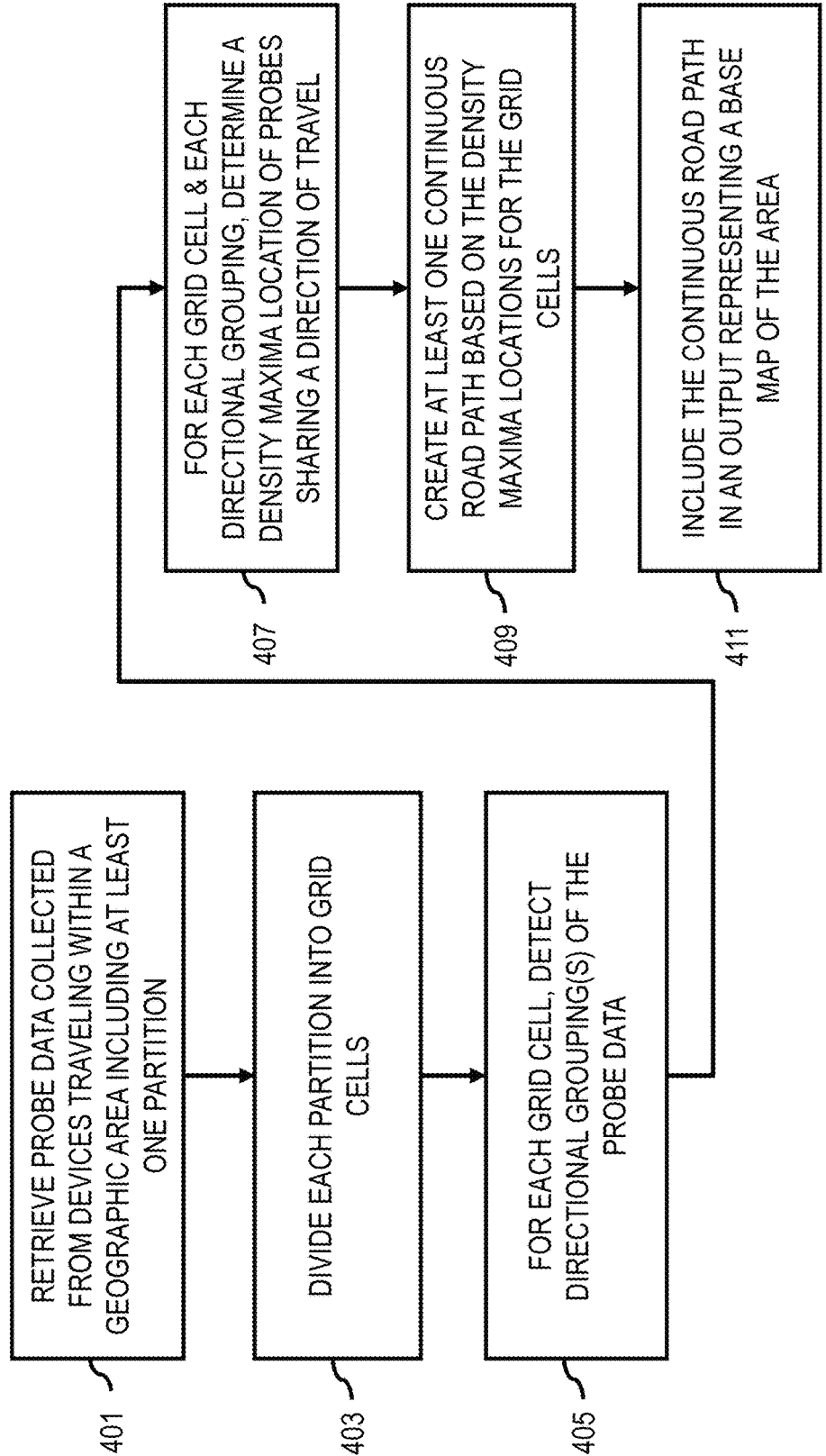

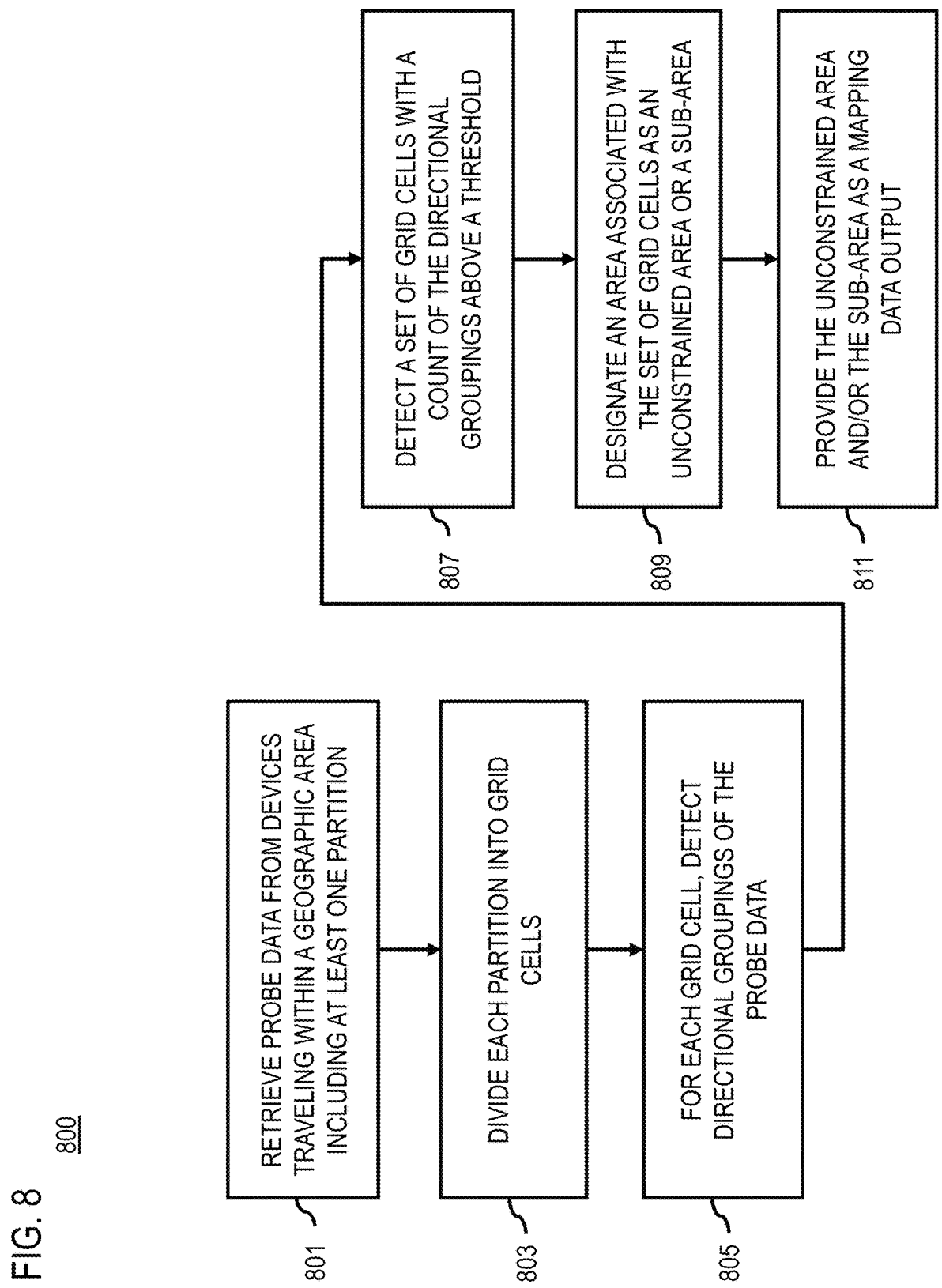

METHOD, APPARATUS, AND SYSTEM FOR IDENTIFYING SPECIAL AREAS AND CLEANING-UP MAP DATA

BACKGROUND

Providing accurate map data (e.g., road geometry, lane lines, etc.) is a key function for mapping service providers. Scalable map creation requires efficient probe data processing with algorithms adapted for distributed computing environment. In addition, to create an accurate road geometry representation, it is necessary to identify and exclude noises caused by special areas (e.g., work areas) and/or special equipment (e.g., tree-trimming vehicles) that do not represent permanent road segments. In addition, as autonomous vehicles becomes more popular, it is beneficial to apply elevation data to yield a three-dimensional road geometry representation (e.g., highway bridges) to support self-driving. Accordingly, mapping service providers face significant technical challenges to efficiently create a road geometry representation with better fidelity while excluding special areas from the road geometry.

Some Example Embodiments

Therefore, there is a need for an approach for creating a road geometry representation (e.g., a base map with double digitized roads representing actual travel paths and connectivity) and identifying special areas with significant vehicle activities that do not represent established roads (e.g., construction areas).

According to one embodiment, a method comprises retrieving probe data collected from one or more sensors of one or more probe devices traveling within a geographic area including at least one geographic partition. The method also comprises dividing each of the at least one geographic partition into a plurality of grid cells. The method further comprises, for each grid cell of the plurality of grid cells, detecting one or more directional groupings of the probe data. The one or more directional groupings comprise one or more probes of the probe data that share a respective common direction of travel. The method further comprises, for said each grid cell and each directional grouping of the one or more directional groupings, determining a density maxima location of the one or more probes sharing the respective common direction of travel. The method further comprises creating at least one continuous road path based on the density maxima locations for the plurality of grid cells. The method further comprises including the at least one continuous road path in an output representing a base map of the geographic area.

According to another embodiment, an apparatus comprises at least one processor, and at least one memory including computer program code for one or more computer programs, the at least one memory and the computer program code configured to, with the at least one processor, cause, at least in part, the apparatus to retrieve probe data collected from one or more sensors of one or more probe devices traveling within a geographic area including at least one geographic partition. The apparatus is also caused to divide each of the at least one geographic partition into a plurality of grid cells. The apparatus is further caused to, for each grid cell of the plurality of grid cells, detect one or more directional groupings of the probe data. The one or more directional groupings comprise one or more probes of the probe data that share a respective common direction of travel. The apparatus is further caused to, for said each grid cell and each directional grouping of the one or more directional groupings, determining a density maxima location of the one or more probes sharing the respective common direction of travel. The apparatus is further caused to create at least one continuous road path based on the density maxima locations for the plurality of grid cells. The apparatus is further caused to include the at least one continuous road path in an output representing a base map of the geographic area.

According to another embodiment, a non-transitory computer-readable storage medium carries one or more sequences of one or more instructions which, when executed by one or more processors, cause, at least in part, an apparatus to retrieve probe data collected from one or more sensors of one or more probe devices traveling within a geographic area including at least one geographic partition. The apparatus is also caused to divide each of the at least one geographic partition into a plurality of grid cells. The apparatus is further caused to, for each grid cell of the plurality of grid cells, detect one or more directional groupings of the probe data. The one or more directional groupings comprise one or more probes of the probe data that share a respective common direction of travel. The apparatus is further caused to, for said each grid cell and each directional grouping of the one or more directional groupings, determining a density maxima location of the one or more probes sharing the respective common direction of travel. The apparatus is further caused to create at least one continuous road path based on the density maxima locations for the plurality of grid cells. The apparatus is further caused to include the at least one continuous road path in an output representing a base map of the geographic area.

According to another embodiment, an apparatus comprises means for retrieving probe data collected from one or more sensors of one or more probe devices traveling within a geographic area including at least one geographic partition. The apparatus also comprises means for dividing each of the at least one geographic partition into a plurality of grid cells. The apparatus further comprises means for, for each grid cell of the plurality of grid cells, detecting one or more directional groupings of the probe data. The one or more directional groupings comprise one or more probes of the probe data that share a respective common direction of travel. The apparatus further comprises means for, for said each grid cell and each directional grouping of the one or more directional groupings, determining a density maxima location of the one or more probes sharing the respective common direction of travel. The apparatus further comprises means for creating at least one continuous road path based on the density maxima locations for the plurality of grid cells. The apparatus further comprises means for including the at least one continuous road path in an output representing a base map of the geographic area.

According to one embodiment, a method comprises retrieving probe data collected from one or more sensors of one or more probe devices traveling within a geographic area including at least one geographic partition. The method also comprises dividing each of the at least one geographic partition into a plurality of grid cells. The method further comprises, for each grid cell of the plurality of grid cells, detecting one or more directional groupings of the probe data. The one or more directional groupings comprise one or more probes of the probe data that share a respective common direction of travel. The method further comprises detecting a set of grid cells with a count of the one or more directional groupings that is above a count threshold. The method further comprises designating an area associated with the set of grid cells as an unconstrained area or a sub-area of the unconstrained area. The unconstrained area is an area in which travel is not constrained to a road network. The method further comprises providing the unconstrained area, the sub-area, or a combination thereof as a mapping data output.

According to another embodiment, an apparatus comprising at least one processor, and at least one memory including computer program code, the at least one memory and the computer program code configured to, with the at least one processor, cause the apparatus to retrieve probe data collected from one or more sensors of one or more probe devices traveling within a geographic area including at least one geographic partition. The apparatus is also caused to divide each of the at least one geographic partition into a plurality of grid cells. The apparatus is further caused to, for each grid cell of the plurality of grid cells, detect one or more directional groupings of the probe data. The one or more directional groupings comprise one or more probes of the probe data that share a respective common direction of travel. The apparatus is further caused to detect a set of grid cells with a count of the one or more directional groupings that is above a count threshold. The apparatus is further caused to designate an area associated with the set of grid cells as an unconstrained area or a sub-area of the unconstrained area. The unconstrained area is an area in which travel is not constrained to a road network. The apparatus is further caused to provide the unconstrained area, the sub-area, or a combination thereof as a mapping data output.

According to another embodiment, a computer-readable storage medium carrying one or more sequences of one or more instructions which, when executed by one or more processors, cause an apparatus to retrieve probe data collected from one or more sensors of one or more probe devices traveling within a geographic area including at least one geographic partition. The apparatus is also caused to divide each of the at least one geographic partition into a plurality of grid cells. The apparatus is further caused to, for each grid cell of the plurality of grid cells, detect one or more directional groupings of the probe data. The one or more directional groupings comprise one or more probes of the probe data that share a respective common direction of travel. The apparatus is further caused to detect a set of grid cells with a count of the one or more directional groupings that is above a count threshold. The apparatus is further caused to designate an area associated with the set of grid cells as an unconstrained area or a sub-area of the unconstrained area. The unconstrained area is an area in which travel is not constrained to a road network. The apparatus is further caused to provide the unconstrained area, the sub-area, or a combination thereof as a mapping data output.

According to another embodiment, an apparatus comprises means for retrieving probe data collected from one or more sensors of one or more probe devices traveling within a geographic area including at least one geographic partition. The apparatus also comprises means for dividing each of the at least one geographic partition into a plurality of grid cells. The apparatus further comprises means for, for each grid cell of the plurality of grid cells, detecting one or more directional groupings of the probe data. The one or more directional groupings comprise one or more probes of the probe data that share a respective common direction of travel. The apparatus further comprises means for detecting a set of grid cells with a count of the one or more directional groupings that is above a count threshold. The apparatus further comprises means for designating an area associated with the set of grid cells as an unconstrained area or a sub-area of the unconstrained area. The unconstrained area is an area in which travel is not constrained to a road network. The apparatus further comprises means for providing the unconstrained area, the sub-area, or a combination thereof as a mapping data output.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1 is a diagram of a system capable of creating a base map and identifying special areas, according to one embodiment;

FIG. 4 is a flowchart of a process for creating a base map, according to one embodiment;

FIG. 8 is a flowchart of a process for identifying and processing special areas, according to one embodiment;

DESCRIPTION OF SOME EMBODIMENTS

Figure 2A:
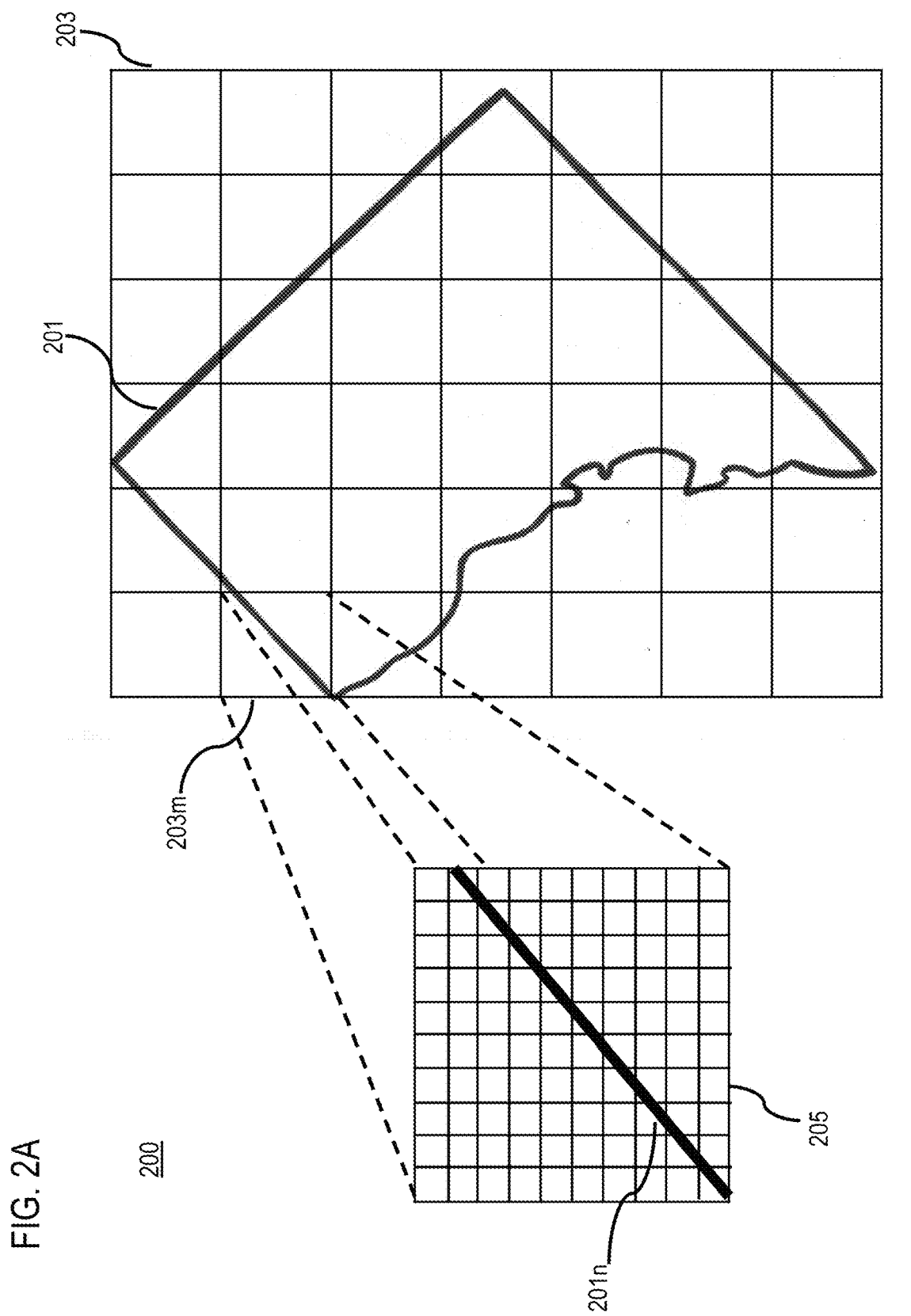
FIGS. 2A-2D are diagrams illustrating a partitioning scheme applied on probe data to create a road geometry, according to various embodiment.

Examples of a method, apparatus, and computer program for creating a base map and identifying special areas are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

FIG. 1 is a diagram of a system 100 capable of creating a base map (including a road geometry 101) and identifying special areas, according to one embodiment. By way of example, the road geometry includes three intersections (e.g., an intersection 102). As mentioned above, scalable map creation requires efficient probe data processing with algorithms adapted for distributed computing environment. The existing techniques can create road geometry and topology using probe data, thereby providing maps with double digitized roads. However, the existing techniques require storing the probe data via the whole process until a road network is identified. In addition, to provide an accurate road geometry, it is beneficial to identify and exclude map noises, such as unstable roads in special areas (e.g., a loading area) from the road geometry, as well as to distinguish turn paths within intersections from unstable paths in the special areas. Moreover, there is an increasing demand to provide three-dimensional (3D) base map to support navigation and/or self-driving, such as providing a 3D road geometry including slopes, highway bridges, etc. thereby providing speed recommendations, decreasing fuel consumption, improving safety and compliance, etc.

To address these problems, the system 100 of FIG. 1 introduces a capability to create a road geometry representation (e.g., a base map with double digitized roads representing actual travel paths and connectivity) and identify special areas with significant vehicle activities that do not represent established roads (e.g., construction areas). In one embodiment, the system 100 can create from probe data on a cloud-based distributed system, thereby covering large geographical areas in one process. In one embodiment, the system 100 can prepare probe data into seed points, then continue with the seed points (without the probe data), to increase a processing speed while saving storage resources (by discarding the probe data). In one embodiment, the system 100 can pre-process (e.g., filtering) probe data and/or sensor data for more precise road centerline reconstruction. By way of example, some of the probes can be excluded via filtering or an alternative selection to be explained later.

By way of example, the system 100 can start with data preparation that involves probe pre-processing, sensor pre-processing, and estimate a geographical span and/or a data density of the probe/sensor data. FIGS. 2A-2D are diagrams illustrating a partitioning scheme applied on probe data to create a road geometry, according to various embodiment. To create a road geometry, the system 100 can apply a geo-spatial partitioning scheme to probe data and ensure a data size in each partition to be processed efficiently.

FIG. 2A is a diagram illustrating an example geo-spatial partitioning scheme, according to one embodiment. The diagram 200 shows an area of interest (e.g., a Washington D.C. map 201) divided into partitions 203 for the purposes of distributed/parallelized processing. FIG. 2A omits probe data to provide a simple and clear illustration. For instance, a partition can be in a scale of square kilometers/miles with chunks of probe data to be processed in parallel. Typically, a number of roads are contained in a partition. To implement the algorithm, the system 100 can divide each partition 203 into grid cells 205. The size of the grid cells is chosen depending on probe density and precision. In most applications, grid cell sizes are of the order of, or smaller than, road lane separation. By way of example, a partition 203m containing a portion of Washington D.C. borderline 201n is divided into grid cells 205. At the end of the processing, results from the partitions 203 can be assembled to create a road map for the whole area. The gird in FIG. 2A is simplified since an up-to-scale illustration would not be readable. By way of example, if the system 100 divides a partition 203 of size 5 km by 5 km into grid cells of size of 10 m by 10 m, the number of cells in the partition 203 would be 500×500 (too many to be visible in FIG. 2A). Occupationally, the geographical area can be small enough to be contained and processed as a single partition.

The following process can be performed in parallel for the probes in each partition 203. The partition 203 can be divided in a uniform grid that defines points for initial estimates of probe density and direction determinations. By way of example, FIG. 2A shows an example geo-partition 203 with grid cells 205 applied on probes. All possible groupings of the probes by direction are detected for all or some of the probes in each grid cell 205. For instance, the directions can be calculated based on all of the probes-contained in the grid cell 205. As another instance, the directions can be calculated based on the probes contained in a radius R around a grid cell center. The number of common directions in each grid cell 205 can be one (indicating a single road) or multiple (indicating bi-directional travel of one road, intersections, or merges/splits of multiple roads, etc.). For each grid cell 205 and each probe direction group that share a common direction, the system 100 can search for the highest density location in the neighborhood region, subject to a perpendicular constraint to a polyline. The found density maxima are saved, along with various probe points and features, to be used in subsequent steps. The locations are referred to in the following as "seed" or "density" points. Once the density points are established, the probes are no longer needed for the subsequent steps, and memory resources can be freed.

Figure 2B:
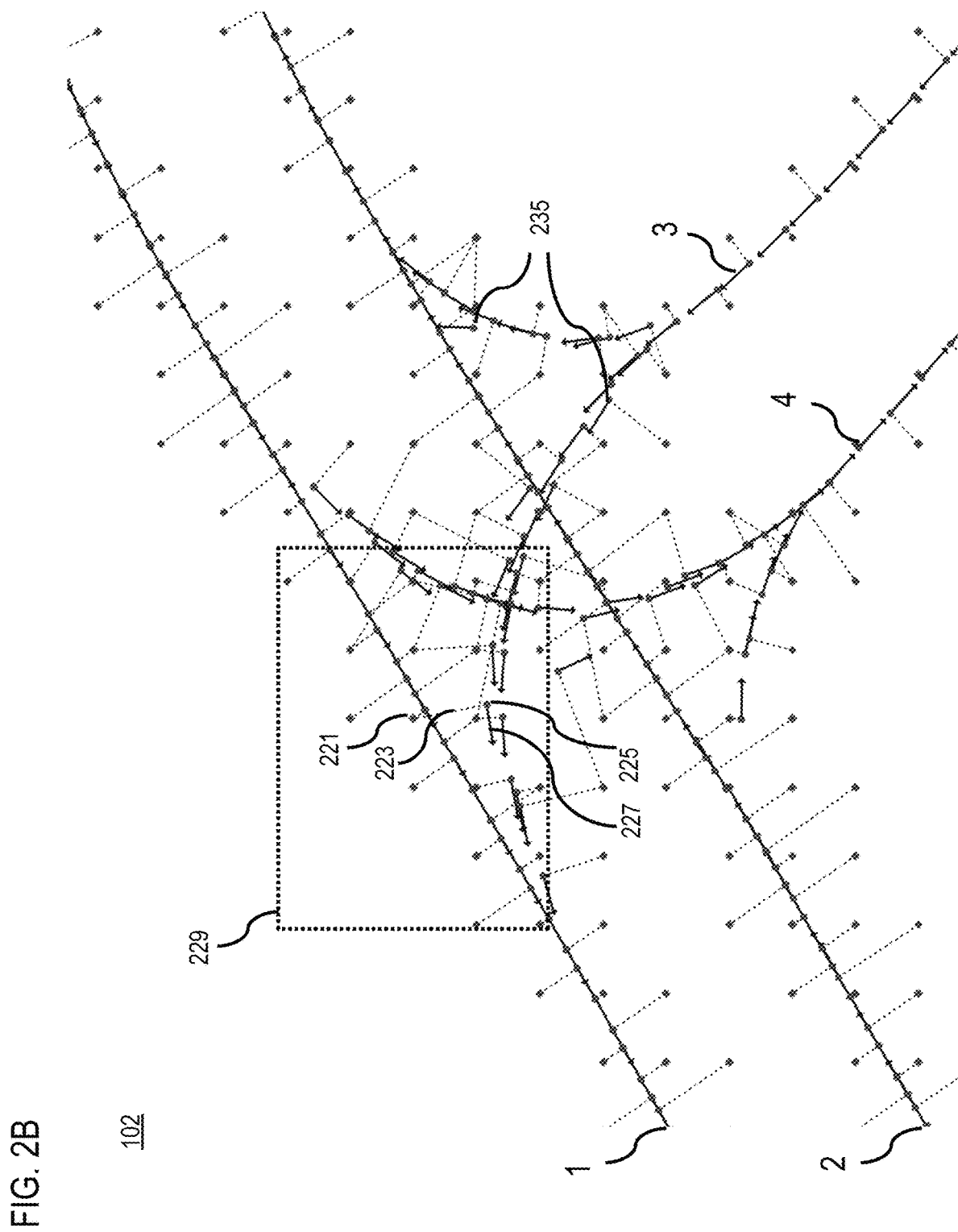

FIG. 2B is a diagram illustrating example seed points generated from probes, according to one embodiment. FIG. 2A omits probe data to provide a simple and clear illustration of the intersection 102 which is a part of the road geometry 101 in FIG. 1. In FIG. 2B, each seed point is generated based on a calculated weighted position of the probes in each grid cell 205 as it migrates from the grid cell 205 onto a maximum probe density position (which forms a part of polyline, e.g., a polyline 3 or a centerline of a road segment) using constrained mean shift, for example. By way of example, each square represent a center 221 of a grid cell 205. A dotted line 223 shows the migration of a calculated weighted position of the probes 203 within a radius R from the grid cell center 221 migrating from the grid cell center 221 to the maximum probe density position that defines the location of a seed point 225, for each identified common direction 227 (e.g., an arrow indicating the direction of travel). Such calculated weighted position of the probes within a radius R from the grid cell center 221 is also known as a weighted center of gravity that migrates until reaching the maximum density point, i.e., the seed point 225. The maximum density point is different for each grid cell. Polylines reflect the existence of roads in the vicinity.

Figure 2C:
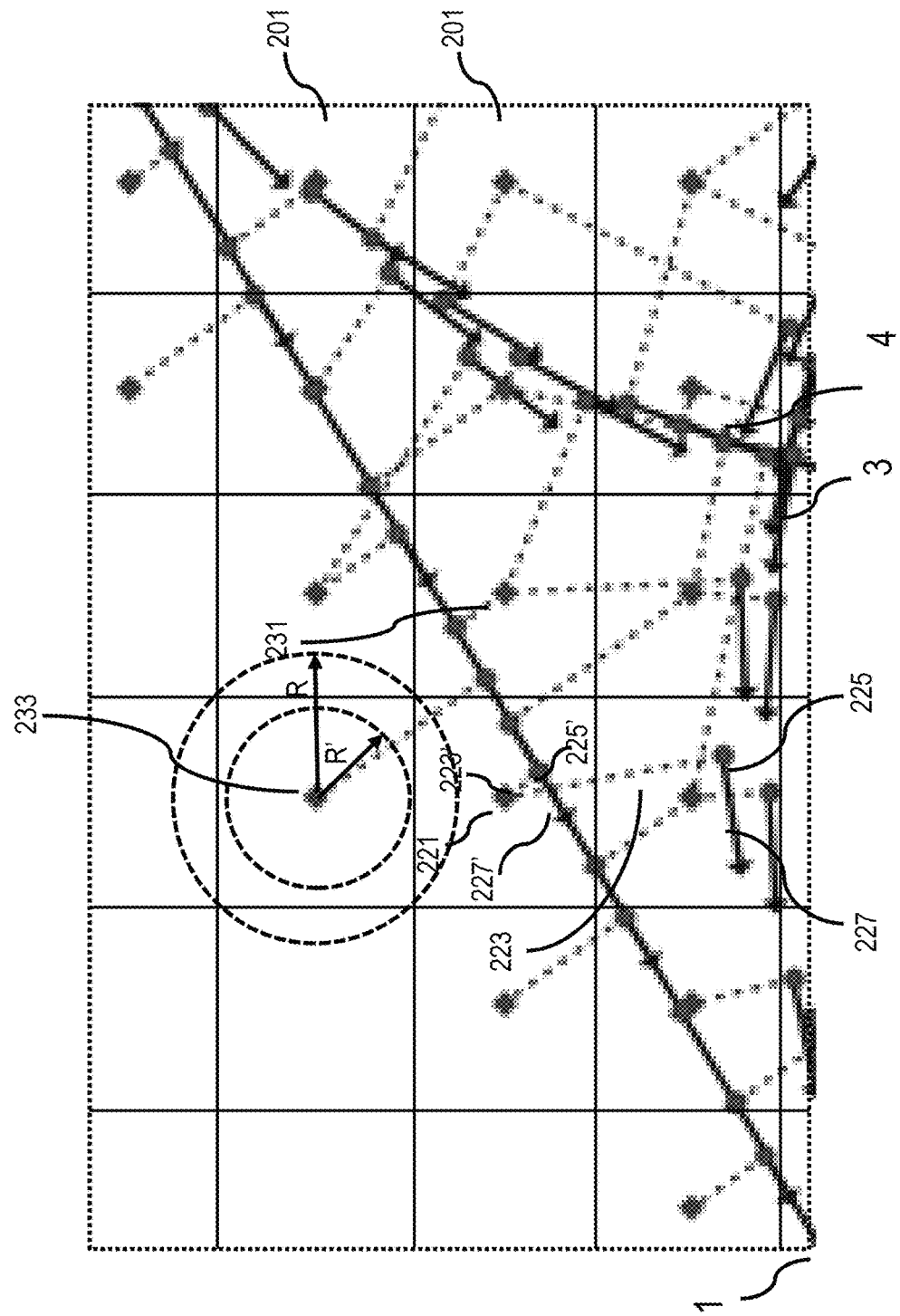

In FIG. 2B, a small area of interest 229 is marked in a broken line to be enlarged and shown in FIG. 2C. FIG. 2C is a diagram illustrating the area 229 of the diagram of FIG. 2B as enlarged, according to one embodiment. In some instance, multiple dotted lines can originate from the same center of a grid cell that indicates multiple common directions of the probes in the grid cell. For example, the center 221 is close to both polyline 1 and polyline 3, thus has dotted lines 223, 223' showing the migration of two calculated weighted positions of the probes within a radius R from the respective grid centers 221 to their respective maximum density points, i.e., seed points 225, 225' for two common directions 227, 227' along the polyline 3 and the polyline 1 respectively. As another example, calculated weighted positions of the probes 203 within the radius R from a center 231 of a grid cell in FIG. 3C is close to polyline 1, polyline 3, and polyline 4 thus having three migration directions to three seed points for three common directions. For instance, the radius R can be large enough to fully enclose the grid cell. As another instance, the system 100 use a radius R' that is fully within the grid cell to reduce computation.

Some of the seed points in FIG. 3C are located far from the originating grid center that may be caused by speared probes of a set positioning precision, vehicles taking different paths, etc. These probes can form a "cloud" around the road lines, and the road centerlines can be expected to coincide with the maximum probe density positions, i.e., seed points. A seed point most distant from a grid cell center contains a tail of a respective probe distribution thus have to move/migrate further.

The seed/density points 225 cab be grouped into sequences based on direction, proximity, and other criteria to form polylines as representations of continuous segments of the road network. Once these polylines are available, searches for connections to other polylines/curves and detection of polyline/curve intersections are performed. The polylines/curves (and their extensions where applicable) are split at the connection and/or intersection points, forming topological segments represented as graph edges of a road geometry graph. The connection and/or intersections points, as well as unattached segment end points serve as graph nodes of the road geometry graph. In one embodiment, some segment that are consistent with mis-reconstruction due to data noise, and the graph is updated can be pruned from the geometry graph.

Figure 2D:
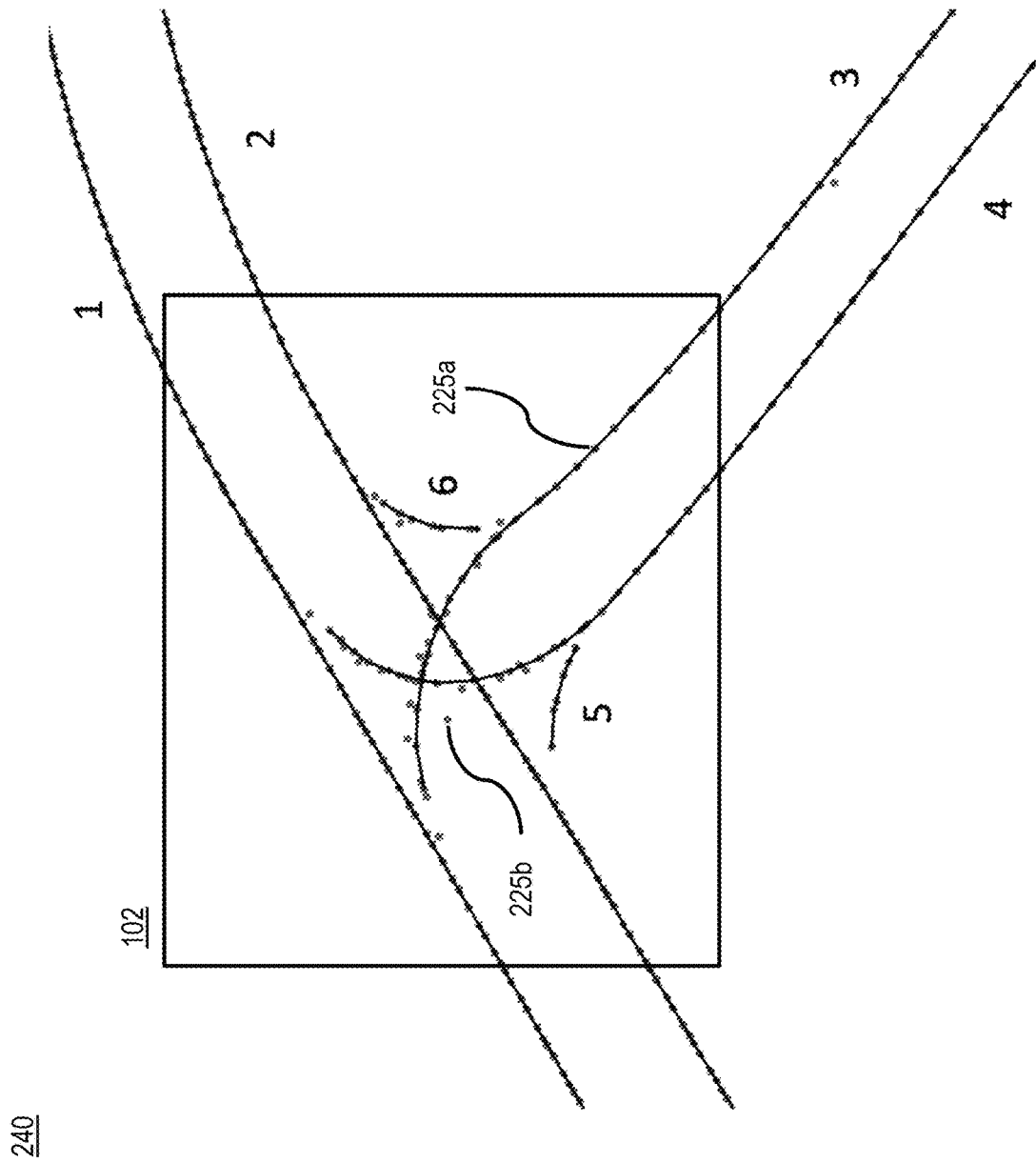

FIG. 2D is a diagram illustrating an example road geometry 240 with polylines, according to one embodiment. In FIG. 2D, the intersection 102 (marked in a box) involves polylines 1-6 created by linking seed points 225 (e.g., a seed point 225a). In one embodiment, the system 100 can preprocess (e.g., filtering) seed point data for more precise road centerline reconstruction. By way of example, some of the seed points (e.g., a seed point 225b) can be excluded via filtering or other alternative selection to be explained later.

When the parallel processing of the partitions (e.g., tiles) is completed, the system 100 can get a set of road geometry graphs for each partition. These graphs contain unconnected segments at the boundaries that have to be merged with their continuations in the neighboring partitions/tiles. After this segment merging procedure, the whole area road geometry map is available for storage following a predetermined map scheme (e.g., a map tile scheme). In one embodiment, the system 100 process not only the probes contained in one partition but also probes in some vicinity/margin of the partition for extracting road geometries. The additional probes improve connectivity/continuity of road segments across petition borders.

The above steps can be subject to filtering/cleaning processes to improve accuracy, such as identifying and excluding special areas and/or special events. By way of example, the system 100 can exclude noise in the process of road geometry creation based on additional equipment information. As another example, the system 100 can detect unconstrained areas with significant vehicle activities where travel is not constrained to a road network. Such unconstrained areas do not represent established roads and should be excluded from the road network. In another embodiment, the system 100 can use additional sensor data to detect special areas of the road network or neighboring infrastructure, like work areas, loading/unloading zones, mine sites, construction areas, warehousing areas, parking areas, etc.

In one embodiment, the system 100 can process sensor data from one or more vehicles 103a-103n (also collectively referred to as vehicles 103) (e.g., standard vehicles, autonomous vehicles, heavily assisted driving (HAD) vehicles, semi-autonomous vehicles, etc.). In one instance, the vehicles 103 include one or more vehicle sensors 105a-105n (also collectively referred to as vehicle sensors 105) (e.g., positioning sensors) and have connectivity to a mapping platform 107 via a communication network 109. In one embodiment, the sensor data includes probe data may be reported as probes, which are individual data records collected at a point in time that records telemetry data for that point in time. A probe point can include attributes such as: (1) source ID, (2) longitude, (3) latitude, (4) elevation, (5) heading, (6) speed, (7) time, and (8) access type. A source/ probe can be a vehicle, a drone, a user device travelling with the vehicle, etc. Probe data can be used to define probe (e.g., a vehicle) travel paths, count numbers of contributing vehicles, forming "drives" by a location point (together with time information), etc.

In one embodiment, the system 100 can also collect probe data from one or more user equipment (UE) 111a-111n (also collectively referenced to herein as UEs 111) associated with the vehicles 103 (e.g., an embedded navigation system), a user or a passenger of a vehicle 103 (e.g., a mobile device, a smartphone, a client terminal, etc.), or a combination thereof. In one instance, the UEs 111 may include one or more applications 113a-113n (also collectively referred to herein as applications 113) (e.g., a navigation or mapping application). In one embodiment, the system 100 may also collect the probe data from one or more other sources such as government/municipality agencies, local or community agencies (e.g., police departments), and/or third-party official/semi-official sources (e.g., the services platform 115, one or more services 117a-117n, one or more content providers 119a-119m, etc.). In one instance, the probe data collected by the vehicle sensors 105, the UEs 111, one or more other sources, or a combination thereof may be stored in a probe data layer 121 of a geographic database 123 or a combination thereof.

Figure 3:
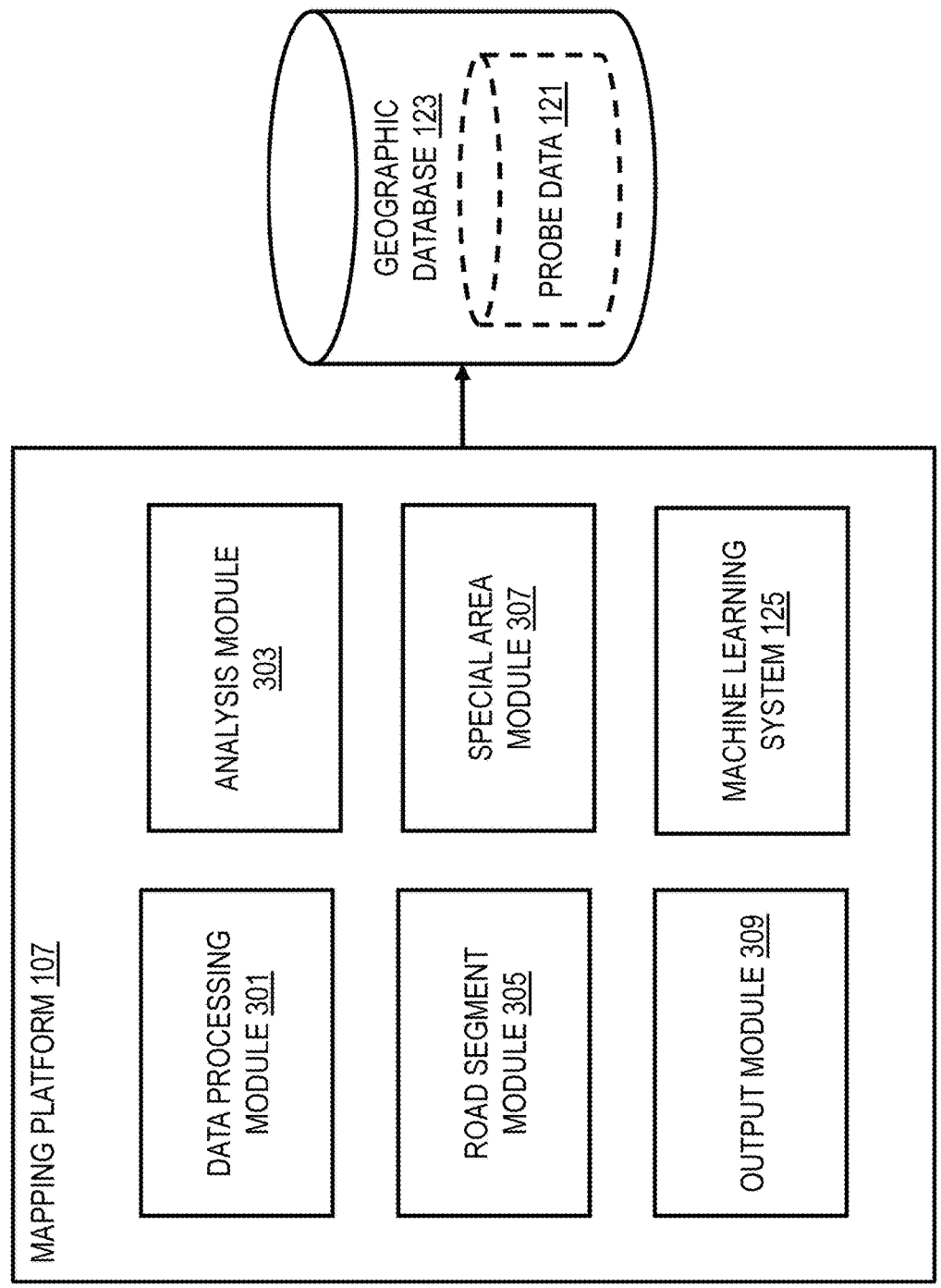
FIG. 3 is a diagram of the components of a mapping platform configured to create a base map and identify special areas, according to one embodiment.

FIG. 3 is a diagram of the components of a mapping platform configured to create a base map and identify special areas, according to one embodiment. By way of example, the mapping platform 107 includes one or more components for creating a base map and identifying special areas, according to the various embodiments described herein. It is contemplated that the functions of these components may be combined or performed by other components of equivalent functionality. In one embodiment, the mapping platform 107 includes an data processing module 301, an analysis module 303, a road segment module 305, a special area module 307, an output module 309, and a machine learning system 125, and has connectivity to the geographic database 123 including the probe data layer 121. The above presented modules and components of the mapping platform 107 can be implemented in hardware, firmware, software, or a combination thereof. Though depicted as a separate entity in FIG. 1, it is contemplated that the mapping platform 107 may be implemented as a module of any other component of the system 100. In another embodiment, the mapping platform 107 and/or the modules 301-309 may be implemented as a cloud-based service, local service, native application, or combination thereof. The functions of the mapping platform 107, the machine learning system 125, and/or the modules 301-309 are discussed with respect to FIGS. 4-11.

Figure 14:
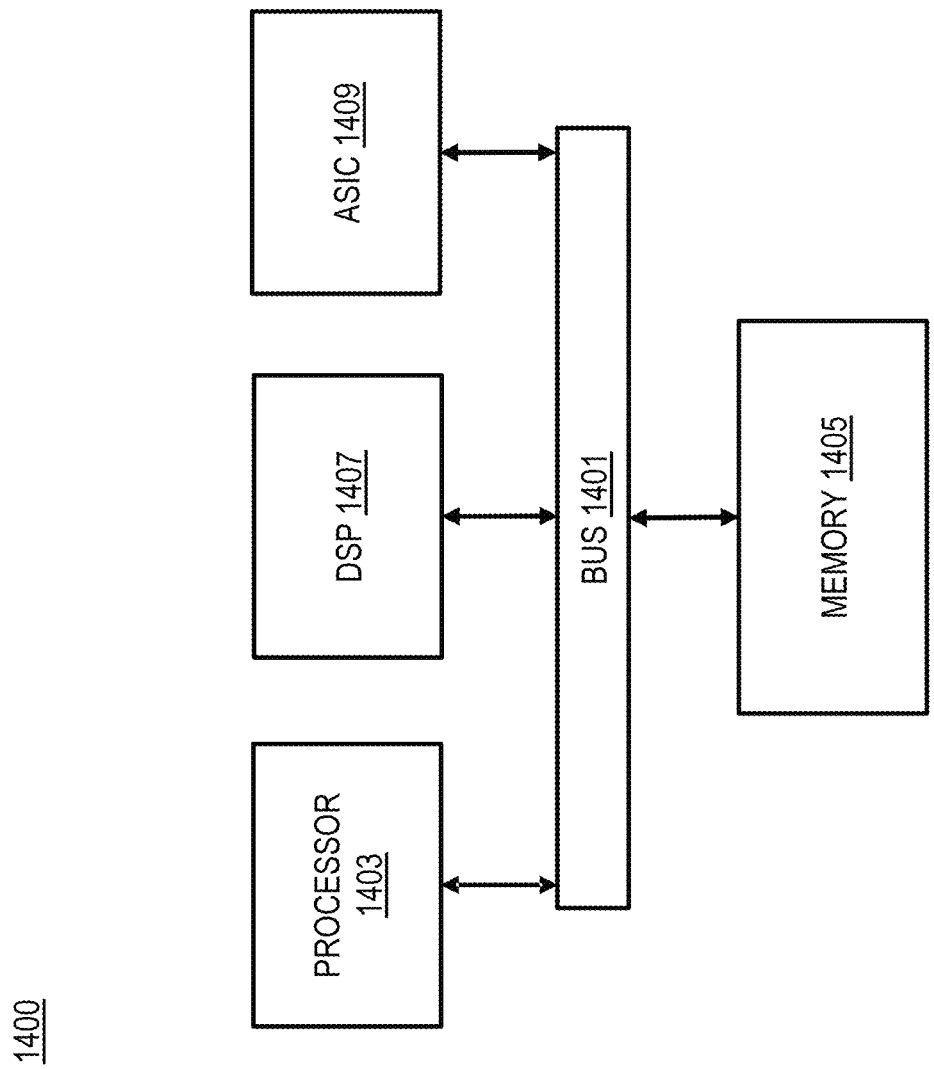
FIG. 14 is a diagram of a chip set that can be used to implement an embodiment.

FIG. 4 is a flowchart of a process for creating a base map, according to one embodiment. In various embodiments, the mapping platform 107, the machine learning system 125, and/or any of the modules 301-309 may perform one or more portions of the process 400 and may be implemented in, for instance, a chip set including a processor and a memory as shown in FIG. 14. As such, the mapping platform 107, the machine learning system 125, and/or the modules 301-309 can provide means for accomplishing various parts of the process 400, as well as means for accomplishing embodiments of other processes described herein in conjunction with other components of the system 100. Although the process 400 is illustrated and described as a sequence of steps, its contemplated that various embodiments of the process 400 may be performed in any order or combination and need not include all the illustrated steps.

In one embodiment, in step 401, the data processing module 301 can retrieve probe data collected from one or more sensors of one or more probe devices traveling within a geographic area including at least one geographic partition. In one embodiment, probe data includes raw position probes (e.g., probes) sent from vehicles 103 indicating their respective locations by, for example, a latitude and longitude pair. In another embodiment, the probe data further includes altitude of respective locations that can be applied to distinguish vehicle trace points on multiple-level roads/bridges/interchanges.

In another embodiment, the at least one geographic partition include a plurality of geographic partitions representing the geographic area, and the probe data of the plurality of geographic partitions are processed in parallel by respective one or more compute units. For instance, the probe data can be processed on a cloud based distributed system, or any system that allows parallel processing to enable speedup and scaling in large geographical areas in one process, thereby creating a road geometry representation more efficiently. In another embodiment, the process 400 can be executed in a single process for a single partition.

The spatial partitioning of the probe data can be performed in multiple ways subject to efficiency and simplicity of subsequent steps. By way of example, the plurality of geographic partitions are based on a map tile structure of a geographic database. Without restricting the choice, the system 100 can use the spatial partitions correspond to map tiles of a suitable level to process the probe data.

In one embodiment, in step 403, the data processing module 301 can divide each of the at least one geographic partition into a plurality of grid cells. The spatial partitioning of the probe data can be performed in multiple ways subject to efficiency and simplicity of subsequent steps. By way of example, the plurality of geographic partitions are based on a map tile structure of a geographic database. Without restricting the choice, the system 100 can use the spatial partitions correspond to map tiles of a suitable level to process the probe data. A size of the plurality of grid cells can be based on a data density of the probe data. By way of example, the plurality of geographic partitions are based on a map tile structure of a geographic database (e.g., the geographic database 123). For instance, the data processing module 301 can divide each processing partition/tile (optionally with margins) into a rectangular grid of cells of approximately equal height and width. Grid cell sizes can be determined based on a probe density, a probe resolution, a road width, a road complexity, a desired precision, etc. For instance, the higher the probe density and/or resolution, the more road segments can be included therein, the smaller the cell size may be. As another instance, the wider and/or more complicated a road segment, the more probe points are included, the smaller the cell size may be. As another instance, the higher a desired precision, the smaller the cell size may be.

In one embodiment, in step 405, for each grid cell of the plurality of grid cells, the analysis module 303 can detect one or more directional groupings of the probe data, and the one or more directional groupings can comprise one or more probes of the probe data that share a respective common direction of travel.

For instance, for each grid cell, the analysis module 303 can select the one or more probes of the one or more directional groupings based on a designated radius from a center of the said each grid cell. Referring back to FIG. 2C, probes are collected in a radius R from the center 233 of the grid cell 201. Starting from a fixed equally spaced positions ensures more even probing of the density. In one embodiment, the radius R is usually (but not necessarily) selected to fully enclose a grid cell to utilize all probes therein. The analysis module 303 can analyze the probes contained in radius R to establish groups sharing common travel directions.

Due to a direction precision and/or other factors, the common direction distributions can have some spreads to be accounted for. Some random noise may also be present. In one embodiment, the analysis module 303 can reduces direction finding into a general peak finding problem. By way of example, the analysis module 303 can deploy one or more approaches for peak finding, such as fitting with one or more predefine functions, sliding window weighting (with various shapes), clustering followed by direction weighting, etc. The choice of an approach can depend on the specifics of the probe data, a desired directional resolution, computational restrictions, etc.

Figure 5A:
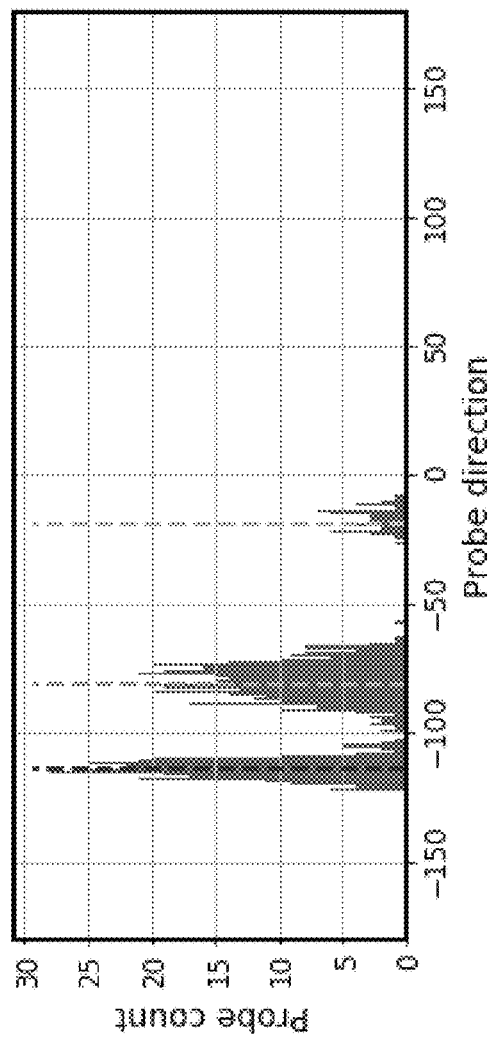
FIGS. 5A-5B are diagrams illustrating examples distributions of directional groupings, according to various embodiments.
Figure 5B:
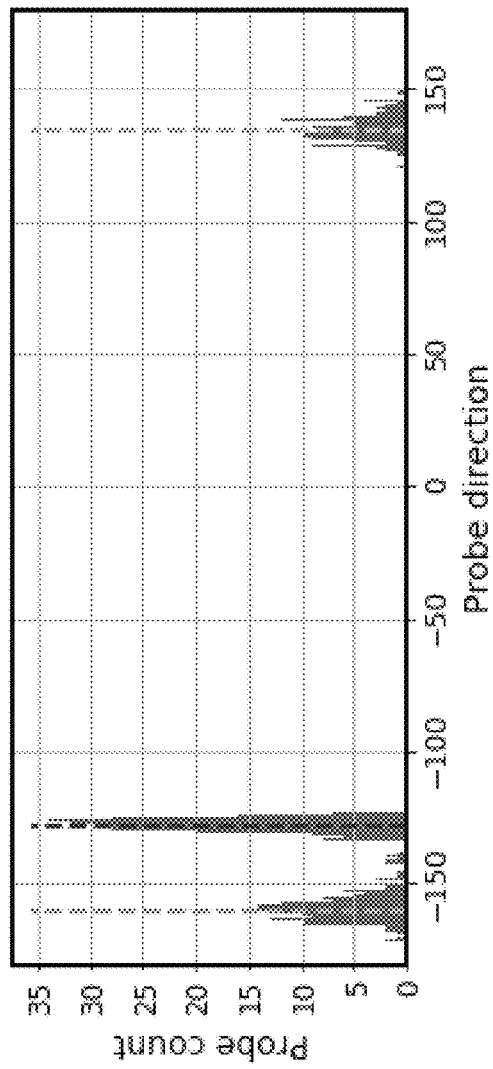

By way of example, the respective common direction of travel associated with the one or more directional groupings can be determined by clustering the probe data according to a direction of travel. FIGS. 5A-5B are diagrams illustrating examples distributions of directional groupings, according to various embodiments. FIGS. 5A-5B have probe detection on the x axis and the probe count on the y axis. For instance, the probes in a respective grid cell are clustered into three directional groupings in FIG. 5A: a first group peak at −115 degree, a second group peak at −85 degree, and a third group peak at −20 degree. As another instance, the probes in another grid cell are clustered into three directional groupings in FIG. 5B: a first group peak at −160 degree, a second group peak at −130 degree, and a third group peak at 135 degree. In another embodiment, the analysis module 303 can take precautions for distributions at the edges of a defined angular range.

Once all the directional groupings in the respective grid cell are determined, the analysis module 303 can assess the directional groupings for significance. Those directional groupings passing all selection criteria define the set of directions associated with the grid cell. Various statistics for each directional grouping are retained and propagated through the following processing to be used in subsequent steps. Depending on the probe data and the parameter choices, the ratio of single-direction versus multi-direction cases can vary. As shown in FIGS. 2B-2C, multi-directional cells mostly occur near intersections, that need to be reconstructed carefully to determine the curves/turns within the intersections with fidelity.

In one embodiment, for each grid cell, the analysis module 303 can estimate a data density of the probe data across the geographic area, and determine a spatial partitioning scheme for creating the plurality of geographic partitions based on data density.

In one embodiment, in step 407, for said each grid cell and each directional grouping of the one or more directional groupings, the analysis module 303 can determine a density maxima location of the one or more probes sharing the respective common direction of travel. By way of example, the density maxima location (e.g., a seed point) is determined based on a local search within said each grid cell that is constrained to move perpendicular the respective common direction travel. For instance, for every direction identified by the probe groupings within a cell, the analysis module 303 can perform a local search for the highest density point calculated only for probes with a consistent direction. As shown in FIG. 2C, the searches for the density maxima can be constrained to move perpendicular to a respective probe group direction. There are multiple maximum search techniques that can be deployed, such as a mean shift approach which is simple, robust, and computationally fast. Some other feature-space analysis techniques for locating the maxima of a density function, such as k-means, simple linear iterative clustering algorithms, etc. may applied.

Once the density maxima for all discovered common directions are found, the analysis module 303 can assign their coordinates as "density points" or "seed points." An example is provided in FIG. 2B, it shows a clear lines of seed points 225 for restricting road segments in subsequent steps. FIG. 2B also shows some misaligned points 235 that are subject to exclusion.

In one embodiment, to avoid duplication, only seed points that reside within the tile boundaries are kept, regardless of the position of a starting grid cell. In another embodiment, seed points that reside in margins of the tile boundaries can also be considered.

In one embodiment, after step 407, all probes can be discarded to save memory resources.

In one embodiment, in step 409, the road segment module 305 can create at least one continuous road path based on the density maxima locations for the plurality of grid cells. The created seed points can include information and/or summary statistics of the probe data used in subsequent steps for map building (as they become the base elements). By way of example, for each grid cell, the analysis module 303 can determine summary statistics of the one or more probes associated with the one or more directional groupings. The summary statistics of the probe data can include, but not limited to, a number of probes, a number of drives, a number of probes associated with a dominant/common direction, s rank of the respective dominant/common direction, a migration distance, etc. A list of drive ID's can also be retained in the summary statistics for subsequent steps that rely on drive ID matching.

The creating of the least one continuous road path in step 409, the determining of the density maxima location in step 407, or a combination thereof can be further based on the summary statistics. For instance, the seed points 225 created in step 407 (e.g., FIGS. 2B-2C) can be used to create continuous road paths represented by polylines 1-6 in FIG. 2D. These polylines can be continuously traversed by vehicles and do not necessarily represent fully extended roads. FIG. 2D shows example polylines in black lines created from the seed points 225 in round dots. Some of the seed points 225 can be filtered away thus not used in the polylines. Some of the polylines can extend outside of FIG. 2D. In one embodiment, the polylines defined by the contributing seed points 225 can be further processed using techniques such as spline smoothing to improve smoothness. In the smoothing process, some seed point positions can be adjusted to their projections on smooth polylines/curves.

In one embodiment, the seed points 225 can be filtered to exclude some lower quality/significance entries based on the seed point attributes/parameters. By way of example, seed point filtering criteria may include, but is not limited to, a number of contributing probes, a number of unique drives, a ranking of the associated common direction, a quality of the common direction determination, etc. In one embodiment, the analysis module 303 can reduce the seed point density to improve computing performance to an extend that does not have negatively impact on quality, for example, by ranking the seed points based on quality (e.g., same as or similar to probe data pre-filtering based on summary statistics) and dropping neighboring seed points within a defined radius and with a consistent direction and lower quality. The difference between these seed point filtering and the probe data pre-filtering is that exclusions are universally applied in the probe data pre-filtering, while exclusions are performed based on comparisons with neighboring seed points in seed point filtering.

In one embodiment, for each grid cell, the analysis module 303 can determine a starting density maxima location from among the density maxima locations determined for said each of the plurality of grid cells based on the summary statistics. The creating of the at least continuous road path begins from the starting density maxima location. The at least one continuous road path is represented as a polyline defined by the density maxima location.

In general, the road path polyline creation can start with any seed point in the partition. To improve efficiency, after seed point quality ranking, the road path polyline creation can start with the highest ranked seed point in the partition. The starting point may reside in the middle of a road segment, and the road segment module 305 can look for extensions both in the forward and backward directions. This procedure cab be simplified by relying on already precompiled information. For forward extensions, the road segment module 305 can look for seed points within a certain angle and/or distance with respect to the current seed point. The angle and distance parameters are tunable parameters that can be chosen based on a typical seed point spacing, positions, angular resolutions, etc. of the seed points in the partition.

By way of example, when more than one seed points are found, the analysis module 303 can rank the seed points based on consistency with the hypothesis that the seed points belong to the same polyline/curve. Ranking factors may include, but are not limited to, proximity to the current seed, consistency of the headings, consistency of the directions of a connecting line with the headings, a number of contributing probes, a number of drives, etc. The consistency can be evaluated in multiple ways, including, but not limited to, rule-based evaluation, likelihood functions, weighted feature ranking metrics, etc. The best candidate passing the criteria is added to the polyline and becomes the starting seed point for the next search. The starting seed point is flagged as "used," and cannot be considered for addition to another polyline/curve at this stage. The discarded seed points in the search area are flagged as "visited," and cannot serve as starting points for new polylines/curves (but may be included in other curves under certain restrictions). The process continues until no forward or backward extension points passing the association criteria are found for this polyline/curve. The highest ranked unused and unvisited seed point becomes the starting seed point for the next road segment polyline. The process continues until there are no more seed points that have not been visited.

In the process of building the road polylines described so far, seed points are associated with one polyline. The polylines/curves created in the previous steps are independent and do not contain information on connectivity. The connectivity between polylines (e.g., road segments) can be added by further extending each polyline to join another polyline, and through intersection detection as follows. In one embodiment, the road segment module 305 can deal with two types of road polylines connectivity: splits/merges, and intersections.

In one embodiment of the segment/polyline extension scheme, when the seed points are closely spaced, the extension can be from the end of one polyline to an existing seed point on another polyline. The decision to make an extension can be based, but is not limited to, the proximity of the end of the first polyline to the seed points on the second polyline, the consistency of the directions of the seed points being joined, the consistency of the direction of the extension of interest with the polyline being extended, etc. By way of example, for each grid cell, the road segment module 305 can determine a connectivity between multiple road paths of the at least one continuous road path based on a proximity threshold between respective density maxima locations of the multiple road paths.

In another embodiment of the segment/polyline extension scheme, additional factors/criteria are considered, such as probe counts at the seeds being joined and the neighboring seed points on the polyline, drive counts, unique drive IDs, etc. The overall combination of the mentioned factors can be rule-based, combined in a likelihood or other scoring function that ranks the suitability of the options/factors. By way of example, for each grid cell, the road segment module 305 can determine a connectivity between multiple road paths of the at least one continuous road path based on probe data summary statistics of respective density maxima locations of the multiple road paths. For instance, the probe data summary statistics can include a number of probes, a number of drives, a unique drive identifier, or a combination thereof.

Overall, the best selection of the polyline/curve extending or joining factors/criteria can ensure both geometric and traffic flow consistency. The geometric consistency can ensure smoothness. The traffic flow consistency can enforce balance of the probe/vehicle flow into and out of a selected merging point (when information is available).

Regarding relatively sparse seed points, the polyline can be extended to join another polyline at a new point created between two seed points that describes the second polyline geometry.

Figure 6:
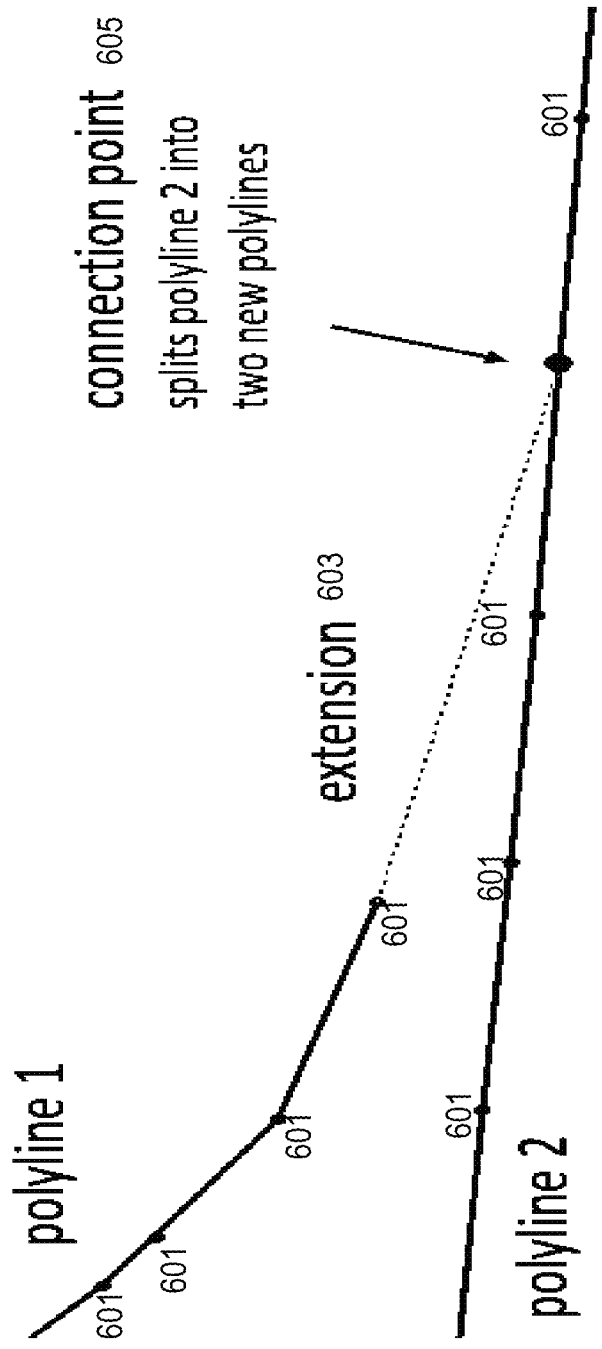
FIG. 6 is a diagrams illustrating an example extension of a road merge, according to one embodiment.
Figure 7A:
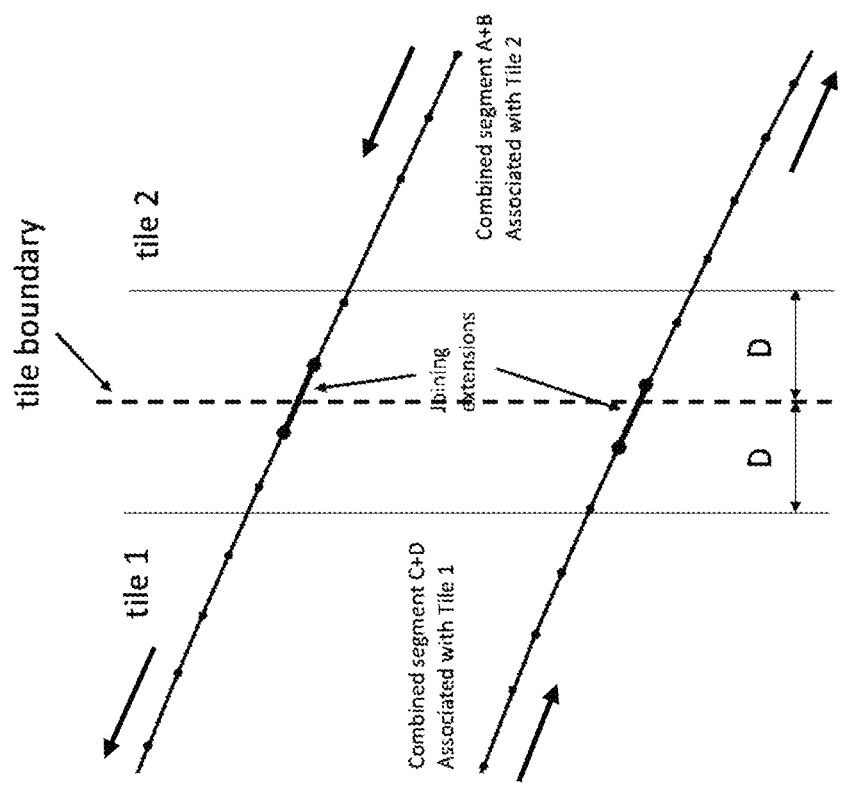
FIGS. 7A-7B that are diagrams illustrating an example of joining map tiles across boundaries, according to one embodiment.
Figure 7B:
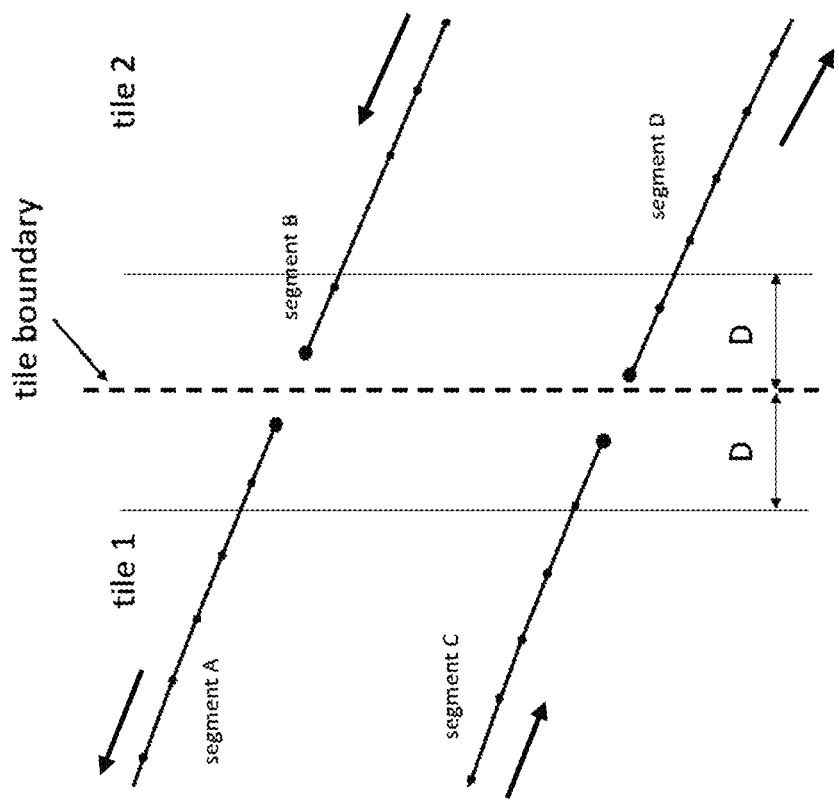

This procedure can be applied for extending both ends of a polyline/road segment. The termination seed point of an extension can be added to an extended polyline. A termination seed point can also split a target polyline into two, and is entered as a node connecting the three modified polylines/road segments. FIG. 6 is a diagrams illustrating an example extension of a road merge, according to one embodiment. FIG. 6 shows polyline 1 and policy line 2 with their respective seed points 601 (in dots). For a merging perspective, the polylines are joined into a road split by an extension 603 (as a broken line) at a node 605. For a splitting perspective, polyline 2 is split into two polylines at the node/intersection 605. Intersection finding is defined as a straight-forward detection of an intersection of two polylines. In another embodiment, each intersection can split each of the polyline 1 and the polyline 2 into two new polylines. The intersection point itself can be added as an endpoint to each of the created polylines and registered as a node connecting the products of the splitting.

The graph of the road network cab be created from the final results of polyline splitting, the nodes created in extensions, intersection finding, etc. In one embodiment, a degree/valence of nodes can also be created for the remaining unconnected polyline ends. In another embodiment, graph pruning algorithms (e.g., pruning least important edges, iteratively layering the graph and pruning nodes and edges in each layer, etc.) can be applied to remove elements that are consistent with noise or to remove drives that do not belong to a stable road network. In another embodiment, map segment geometries can be simplified by removing redundant probes and/or seed points for road geometry using methods such as the Ramer-Douglas-Peucker algorithm that decimates a curve composed of line segments to a similar curve with fewer points.

In one embodiment, graphs representing the map for each partition/tile can contain some partially reconstructed segments that extend to neighboring tiles. To ensure road continuity and to comply with the topological map segment definition, we apply a procedure to merge interrupted tile boundaries segments. By way of example, the plurality of geographic partitions include the probe data that overlap a neighboring geographic partition in overlapping area defined by a distance threshold extending beyond a geographic partition boundary.

Following the map tile example, not only probes with coordinates falling within tile boundaries but also probes within a distance $D_{boundary}$ (i.e., a margin) from tile boundaries can be associated with the data partition corresponding to the tile. Therefore, some probes are associated with more than one tile. This is performed to avoid boundary effects when constructing the building blocks of road segments. For instance, the $D_{boundary}$ is uniform around the tile. As another instance, the $D_{boundary}$ are chosen to be non-uniform around the tile. For example, when the height and the width of the grid cells are different, we define two distances/margins as $D_{boundary}$. The distance(s) $D_{boundary}$ can be chosen based on a spatial probe resolution, a road width, a grid cell size, etc., or a combination thereof. For example, the data processing module 301 can set distance(s) $D_{boundary}$ as multiples of a grid cell size.

In one embodiment, for each grid cell, the road segment module 305 can merge the at least one continuous road path determined for at least two of the plurality of geographic boundaries that extends into the overlapping area based on a proximity, a probe data consistency, or a combination thereof.

By way of example, the road segment module 305 can identify road segments with end points within distance(s) $D_{boundary}$ from the partition/tile boundary. When they are unconnected to other segments, the road segment module 305 can select them as candidates for extensions. The elements of the neighboring tile(s) within distance(s) $D_{boundary}$ of their respective boundaries can be considered as extension targets. In one embodiment, the extension rules can follow criteria similar to the on-tile extensions of polylines. $D_{boundary}$ is simplified as D in FIGS. 7A-7B that are diagrams illustrating an example of joining map tiles across boundaries, according to one embodiment. The most common connection type in across-tiles merging is a segment A of Tile 1 terminated by a node of valence 1 can be connected to segment B of Tile 2 starting at a node of valence 1 in FIG. 7A. The arrows indicate the direction of travel. In this case, a combined polyline is created in FIG. 7B, defining a new map segment A+B associated with Tile 2, the original segments A, B are removed, and the node connectivity information is updated. By analogy, a segment C of Tile 1 terminated by a node can be connected to segment D of Tile 2 starting at a node in FIG. 7A to create a new map segment C+D associated with Tile 1 in FIG. 7B. Other scenarios may involve segment splitting due to extension creation, or to connectivity to nodes of a higher valence. The map information can be updated according to the performed modifications.

In one embodiment, in step 411, the output module 309 can include the at least one continuous road path in an output representing a base map of the geographic area. In other embodiments, the base map further includes connections, intersections, splits/merges, etc. as a graph.

In one embodiment, the output module 309 can provide the detect road segment data, road path data, and/or continuous road path data to the services platform 115 that provides, for example, mapping services, navigation services, traffic incident services, travel planning services, notification services, social networking services, content (e.g., audio, video, images, etc.) provisioning services, application services, storage services, contextual information determination services, location-based services, information-based services (e.g., weather, news, etc.), etc.

In one embodiment, the process 400 may require probes containing position and direction information acceptable for the application precision. The data processing module 301 can pre-process the probe data to remove faulty measurements, for example, by filtering probe data contained in an spatial area of interest that do not contain some essential information such as heading/direction, time sequences, etc. For instance, sequences of probes generated by the same device are formed and ordered by time, and heading and speeds can be determined from these sequences. The data processing module 301 can remove probes missing time parameter to avoid large gaps that can lead to inability to reliably derive heading and speeds.

Although a probe point can include attributes such as: (1) source ID, (2) longitude, (3) latitude, (4) elevation, (5) heading, (6) speed, (7) time, and (8) access type. the process 400 does not require all the attributes. For example, speed information is optional, although it often correlates with direction precision and can be useful in filtering. Association with a continuous time sequence of probes (corresponding to a "drive" or part of a drive) can also be optional and utilized only in some variations of the algorithms. Also, asset type is not required for the base map generation, yet can be used in some optional cleanup procedures and refinements. Additional sensor information is not required for the base map generation, and yet can be used in special cases discussed later.

In one embodiment, to determine a precise road centerline, the data processing module 301 can adjust the probe positions for the placement of the GPS receiver on the vehicle, especially with respect to the vehicle longitudinal axis. For instance, the probe latitude and longitude can be transformed to lie on this axis by taking the direction of the probes as an estimate of an vehicle orientation.

In another embodiment, the data processing module 301 can perform more refined corrections to account for the vehicle placement with respect to features on the terrain. For instance, the data processing module 301 can apply elevation corrections in a similar fashion as needed, by taking into account sensor placement above a ground level. Elevation assignment to the map will be discussed in conjunction with FIG. 8. The above-discussed pro-processing of the probe data can eliminate the need to adjust to the generated road maps. In short, when input probe data is not as clean and as standardized as dedicated map-centric data collection, the system 100 may pro-process the probe data, or adjust parameter(s) in the road map later.

FIG. 8 is a flowchart of a process for identifying and processing special areas, according to one embodiment. In various embodiments, the mapping platform 107, the machine learning system 125, and/or any of the modules 301-309 may perform one or more portions of the process 800 and may be implemented in, for instance, a chip set including a processor and a memory as shown in FIG. 14. As such, the mapping platform 107, the machine learning system 125, and/or the modules 301-309 can provide means for accomplishing various parts of the process 800, as well as means for accomplishing embodiments of other processes described herein in conjunction with other components of the system 100. Although the process 800 is illustrated and described as a sequence of steps, its contemplated that various embodiments of the process 800 may be performed in any order or combination and need not include all the illustrated steps.

As used herein, the term "unconstrained area" refers to an area lack of constraints for the vehicles to follow an established road system, although there might be some unstable paths. Such an unconstrained area can be customized based on an intended use of the map and the nature of the mapped areas, such as construction areas, large storage/warehousing complexes, loading/unloading zones, open mining sites, parking areas, off-roading sites with a mixture of stable routes and gathering/parking/rest areas, etc. For simplicity, various embodiments are described with respect to "work areas"; however, it is contemplated that the approach described herein may be used with other unconstrained areas.

The identification of such areas can serve purposes such as: detecting boundaries and the geographical extent to be excluded from the road map creation, identifying areas possibly evolving in time to track changes for purposes other than road mapping, etc. In one embodiment, the special area module 307 can exclude the unconstrained area from a map making process (except for entry/exit points).

The most economical approach in terms of data requirements is to use the location sensor data (e.g., GPS data) from the map creation process. In this case, the detection approach relies mainly on the randomness of the drives in the work areas. Additional sensor data can be retrieved to determined other types of unconstrained area.

In one embodiment, in step 801, the data processing module 301 can retrieve probe data collected from one or more sensors of one or more probe devices traveling within a geographic area including at least one geographic partition. By way of example, the data processing module 301 can retrieve the data for a geographical area of interest, and partition for parallel processing and proceed with the process 800. Later, the processing results of per partition can be combined for the entire geographical area of interest. Such parallelization at a partition level is optional for identifying special areas.

The data processing module 301 can create a grid structure or reuse the grid structure created for base map creation in process 400. In one embodiment, in step 803, the data processing module 301 can divide each of the at least one geographic partition into a plurality of grid cells like step 403 of the process 400.

In one embodiment, in step 805, for each grid cell of the plurality of grid cells, the analysis module 303 can detect one or more directional groupings of the probe data, and the one or more directional groupings can comprise one or more probes of the probe data that share a respective common direction of travel. By way of example, the analysis module 303 can detect all possible direction groupings for the probes associated with each grid cell, as described in step 405 of the process 400.

Typical reconstructed road systems (e.g., using the base map creation process 400) include mostly one or two directions away from a node, and three and four (rarely) directions from an intersection. As such, the analysis module 303 can use continuous regions of grid cells with direction counts above the expected numbers as a predictor of a work area. In one embodiment, in step 807, the analysis module 303 can detect a set of grid cells with a count of the one or more directional groupings that is above a count threshold (e.g., 5). By way of example, the set of grid cells as an unconstrained area can be detected as a continuous region of the plurality of grid cells with the count above the count threshold.

In one embodiment, the analysis module 303 can determine density of road link nodes detected from the probe data for said each grid cell, and detect the set of grid cells based on the density of the road link nodes. In another embodiment, the set of grid cells as an unconstrained area can be determined using a machine learning algorithm. By way of example, the grouping of cells can be achieved by applying one or more unsupervised machine learning algorithms, such as density-based and/or hierarchical clustering algorithms, on the preselected cells.

In some embodiments, to avoid misidentifying intersections as work areas, the analysis module 303 can set a lower limit on the count of a set of grid cells in such unconstrained area, and/or on a minimum count of the directions in each cell of the set of cells.

In one embodiment, in step 809, the special area module 307 can designate an area associated with the set of grid cells as an unconstrained area or a sub-area of the unconstrained area, and the unconstrained area can be an area in which travel is not constrained to a road network. Some special/unconstrained areas (e.g., work areas) may span across partitions. For instance, the special area module 307 can merging sub-areas across partitions, similarly to the roads spanning multiple partitions during a map geometry creation (e.g., the process 400 in FIG. 4). As another instance, the special area module 307 can use partition padding (e.g., extension of margins to partially overlap with neighboring partitions) by a distance larger than work areas sizes. Then work areas can be fully enclosed in "padded" partitions. Such approach can provide partial duplications that are later removed to ensure work area uniqueness.

In one embodiment, the special area module 307 can represent the unconstrained area as a geometrical envelope. In other words, the definition of the areas spanned by these clustered regions can be specified by geometrical envelopes around them. By way of example, the geometrical envelope can be created based on a concave or convex polygon envelope with a buffer, the concave or convex polygon envelope without a buffer, a density estimated based on one or more kernels, a boundary threshold, or a combination thereof.

Figure 9B:
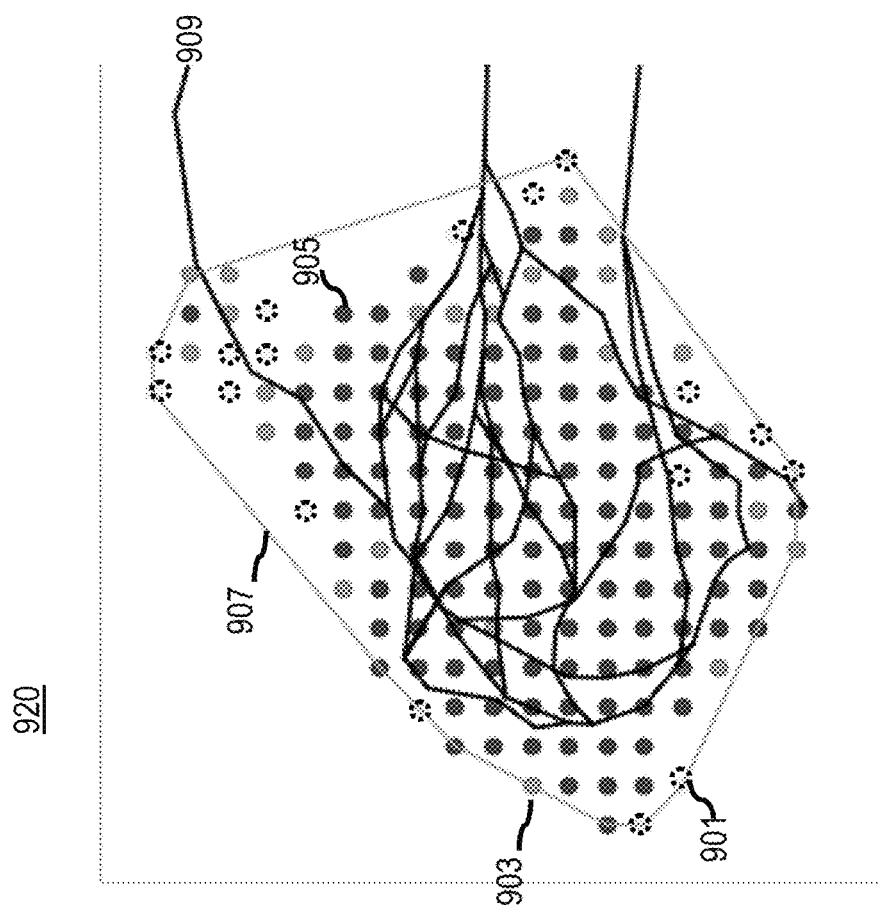
FIGS. 9A-9B are diagrams illustrating example clusters of cells, according various embodiments.
Figure 9A:
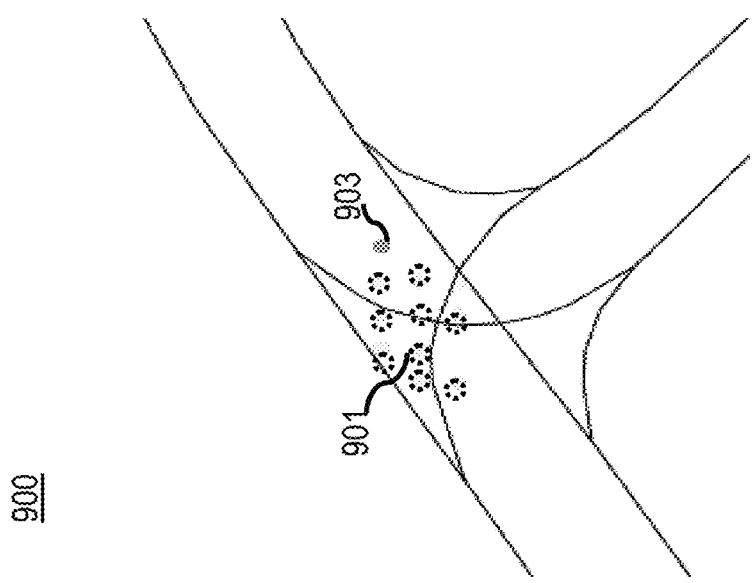

FIGS. 9A-9B are diagrams illustrating example clusters of cells, according various embodiments. A cluster of cells present at an intersection 900 is shown in FIG. 9A, while a cluster of cells present in a small work area 920 is shown in FIG. 9B. The intersection 900 (marked with cell circles) is similar to the intersection in FIG. 2A (marked with a cell grid) with the cells marked differently. The circles indicate positions of cells, and the gray scales of the circles as light cell circles 901, medium cell circles 903, and dark cell circles 905 respectively indicating cells with 3, 4, and 5 detected directions. The simple enclosure of the cluster in the small work area 920 is marked by a thin line 907 in FIG. 9B. The map elements in the work area 920 illustrate what remains after a standard map cleaning that took out most of the random drives. Dedicated identification of the work area 920 allows its full removal from a road network, while retaining three incoming/outgoing roads 909.

In one embodiment, the special area module 307 can filter an intersection area from the unconstrained area based on a clustering score. For instance, the clustering score is based on a participating cell count. As another instance, the cluster score is based on probe speed information, a detection of direction reversal, a detection of parking brake engagement, a detection of a neutral or park gear selection, a detection of a loading or unloading event, or a combination thereof. By way of example, intersections can be filtered out based on assigning an overall cluster score. The intersection 900 in FIG. 9A include nine light cell circles 901 and one medium cell circle 903, while the work area 920 in FIG. 9B include seventeen light cell circles 901, twenty five medium cell circle 903, and one hundred eighteen dark cell circles 905. For instance, the overall cluster score may include multiple factors, such as having medium cell circles and dark cell circles out-number light cell circles (which is applicable to the work area 920 in FIG. 9B but not applicable to the intersection 900 in FIG. 9A). As another instance, the overall cluster score can be as simple as a participating cell count, such as no dark cell circle therein (which is applicable to the intersection 900 in FIG. 9A, but not applicable to the work area 920 in FIG. 9B).

In other embodiments, additional information can be used in evaluating the cells for detecting the work areas. By way of examples, such additional information can include, but is not limited to, probe speed information, detection of direction reversal, parking brake engagement, neutral or park gear selection, loading/unloading events, etc., as detected by various sensors of the vehicles 103, the UE 111, roadside sensors, etc.

For instance, vehicles and/or construction equipment in construction areas have unique operational speed profiles and/or mobility patterns, such as bulldozing, excavating, concrete pouring, loading dirt, unloading building materials, etc. As another instance, vehicles in parking areas have parking mobility patterns and/or speed profiles, such as moving up or down different levels to find a parking space.

In another embodiment, the additional information (e.g., the sensor data) can be combined based on rules, or other manners to assign a cell score indicating whether the cells are more or less likely to belong to a work area. For instance, the cells selected for clustering can be based on such cell score. The additional information can also be used to further discriminate between clusters associated with complex intersections or work areas. In another embodiment, supervised machine learning can be applied on training data (e.g., available existing examples), for creating the cell scores.

Another approach to identify work areas can be based on analysis of the created base map. Due to the random nature of drives in a work area, the created road network (regardless of reconstruction accuracy) is dense. Instead of trying to find clusters of high-direction multiplicity cells, the analysis module 303 can perform clustering of nodes. To separate work areas from intersections, the analysis module 303 can set a threshold number of contributing nodes to a cluster and/or a spatial density of nodes in the cluster expressed as nodes per unit area. By construction, this approach can be applied after base map creation (e.g., the process 400). The effectiveness of this approach may be lower than the approaches described above in certain situations but is still viable.

In one embodiment, the detected work areas can be used in different ways in the map making process. For example, the data processing module 301 and/or analysis module 303 can exclude probes contained in these work areas at the beginning of the base map making process 400. As another example, the road segment module 305 can filter out segments after the base map making process 400 (either fully or partially), leave only segments representing entry/exit roads associated with the work areas, and perform further analysis of the created map.

Another use of the work areas in map creation is to retain some stable/established roads within the work areas, such as roads traversing the work areas and serving as distinct entry/exit points. They can be identified based on stability over time, a high frequency of drives relative to other paths, a connectivity to outside roads, etc. By way of example, the analysis module 303 can monitor the count of the one or more direction groupings of the set of grid cells over a time period, and determine an evolution of the unconstrained area (e.g., a work area) over the time period based on the monitoring. Then the special area module 307 can determine a temporary or permanent road obstruction in the unconstrained area based on the evolution of the unconstrained area over the time period.

In one embodiment, in step 811, the output module 309 can provide the unconstrained area, the sub-area, or a combination thereof as a mapping data output. In another embodiment, whenever detection of work areas is used in any of the described manners, the output module 309 can update a map based on the outcomes for affected nodes and segments.

In one embodiment, the special area module 307 can use obstacle information and/or identification to reduce map noises. As used herein, the term "map noise" refers to the creation of map segments, nodes, connections, etc. represented in a map that were resulted from location traces/trajectories produced in temporary or non-typical drive patterns. Such map noises always present at events that operate outside of tightly controlled map data collection. There are various precautions can be taken to suppress such map noise occurrences, but they are usually at the expense of reducing sensitivity to detecting lightly travelled roads.

Events account for temporary, relatively short traffic alterations (e.g., temporary road obstacles, immobilized vehicles, road work, etc.) can be sources of map noises, and should be flagged. Detection of these events can be beneficial for creating custom maps of mining operations, construction sites, etc., where the road network is constantly changing, and new roads are created/closed on a regular basis.

Figure 10:
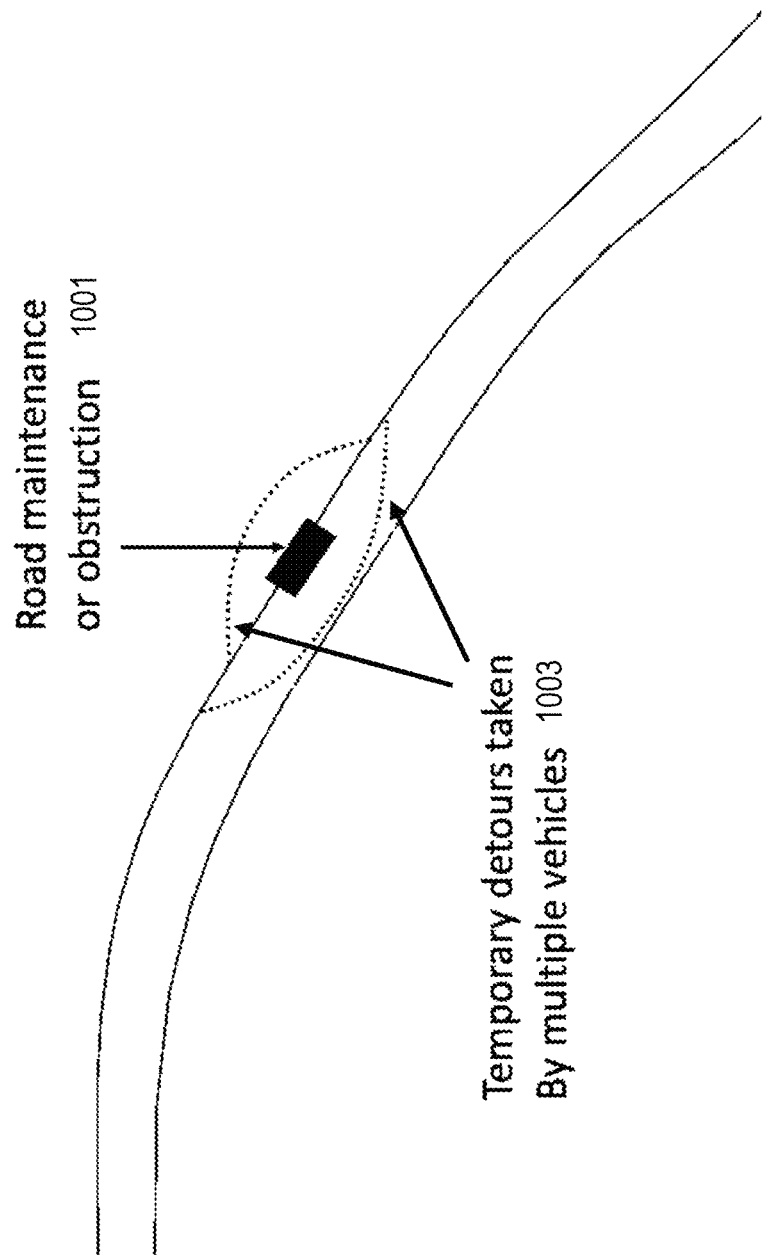
FIG. 10 is a diagram illustrating an example road obstruction, according to one embodiment.

In addition, there are situations for vehicles to go outside of an established road, such as illustrated in FIG. 10. FIG. 10 is a diagram illustrating an example road obstruction, according to one embodiment. The road obstruction (e.g., a road maintenance equipment/vehicle 1001) leads to a temporary change of a drive pattern (e.g., detours 1003 around maintenance equipment/vehicle 1001 by multiple vehicles), that may create a map noise. In one embodiment, the location and time period of validity for temporary road obstacles (e.g., roadway striping, pothole filling, tree trimming, etc.) may be known in advance from independent sources. In other embodiments, it may be possible to determine real-time or substantially real-time from available data, including GPS traces and other sensor information, that the location and time period for temporary road obstacles are propagating using traffic congestion propagation models.

In one embodiment, the special area module 307 can process GPS traces and other sensor information to identify time periods and locations of stationary/mobile equipment. In another embodiment, the special area module 307 can process current and/or historical scheduling and/or mobility data of specialty road maintenance equipment, to establish road work patterns based on continuous presence in a contained area, driving patterns consistent with road work, etc.

After establishing the mobile obstacle location and traffic pattern information, the special area module 307 can search the map for segments or a set of segments consistent with representing temporary detours, and remove the relevant map noises (e.g., road detours) from the map. In one embodiment, a time consistency of the detours 1003 can be established based on the matching of the time period of the obstacle presence to the time of drives on the examined segments, and a spatial consistency of the detours can start within a predefined distance from the obstacle (e.g., the road maintenance equipment/vehicle 1001) and rejoining the main road within a predefined distance.

The above-discussed approaches can be applied for initial base map creation and for incremental map updates (e.g., removing map noises). By way of example, the road segment module 305 can detect a road in the unconstrained area based on a stability of one or more detected paths over time, a high frequency of drives relative to other paths in the unconstrained area, a connectivity to a road outside of the unconstrained area, or a combination thereof.

In one embodiment, the data processing module 301 can determine elevation data associated with the probe data. The one or more directional groupings, the set of grid cells, the unconstrained area, or a combination thereof can be further based on the elevation data.

In some map use cases, such as topographic maps, three-dimensional (3D) maps, etc., elevation information is required. By way of example, when elevations are stored in (at least some) of the probes, there are two approaches to build the base map in 3D: (1) to include elevations as part of the seed point creation and propagate all the way through the final map, and (2) to add the elevations in a separate step after the base map creation.

The (1) method is straight forward but with some drawbacks, such as retaining elevation information through the entire map making process that does not contribute to road reconstruction. Furthermore, since seed point properties are derived in some radius around the position, there are dangers of mixing altitude information of different vertical levels that require complex checks at large number of points when only few can be potentially affected.

In the (2) method, the map is reconstructed in 2D and elevations are assigned after map-matching the probes containing elevation information to the road network. When path-based matchers are deployed, ambiguities on point association with the map are almost completely eliminated. By way of example, four-way intersections are inspected for differences in elevations between pairs of segments. When such differences are detected, under/overpasses are flagged and appropriate elevations for the connecting nodes are assigned as they are applied for each pair. When required by the map specification, the vertical levels (e.g., z-levels) are stored for the shared points at the crossings.

In one embodiment, the machine learning system 125 selects respective factors such as one or more summary statistics of the probes (e.g., a number of probes, a number of drives, a number of probes associated with a dominant direction, a rank of the respective common direction, a migration distance, etc.), transport modes, mobility patterns, driving behaviors, location sensor data, etc., to determine one or more special areas directly, or to determine cell scores then the special areas. In one embodiment, the machine learning system 125 can select or assign respective weights, correlations, relationships, etc. among the factors, to determine the cell scores and/or special areas. In one instance, the machine learning system 125 can continuously provide and/or update a machine learning model (e.g., a support vector machine (SVM), neural network, decision tree, etc.) during training using, for instance, supervised deep convolution networks or equivalents.

In another embodiment, the machine learning system 125 of the mapping platform 107 includes a neural network or other machine learning system to compare (e.g., iteratively) probe summary statistics, mobility patterns, driving behaviors, etc. with model data sets to detect road segments and/or special areas. In one embodiment, the neural network of the machine learning system 125 is a traditional convolutional neural network which consists of multiple layers of collections of one or more neurons (which are configured to process a portion of an input data). In one embodiment, the machine learning system 125 also has connectivity or access over the communication network 109 to the probe data layer 121 and/or the geographic database 123 that can each store probe data, labeled or marked features (e.g., historically expected volumes and/or real-time actual observed volumes on road segments), etc.

In one embodiment the machine learning system 125 can improve the base map creating process and/or the special area identifying process using feedback loops based on, for example, user/vehicle behavior and/or feedback data (e.g., from sensor data). In one embodiment, the machine learning system 125 can improve a machine learning model for creating a base map and/or identifying special areas using user/vehicle behavior and/or feedback data as training data. For example, the machine learning system 125 can analyze correctly created base map and/or correctly identified special areas, missed base map data and/or special area data, etc. to determine the performance of the machine learning model.

Figure 11:
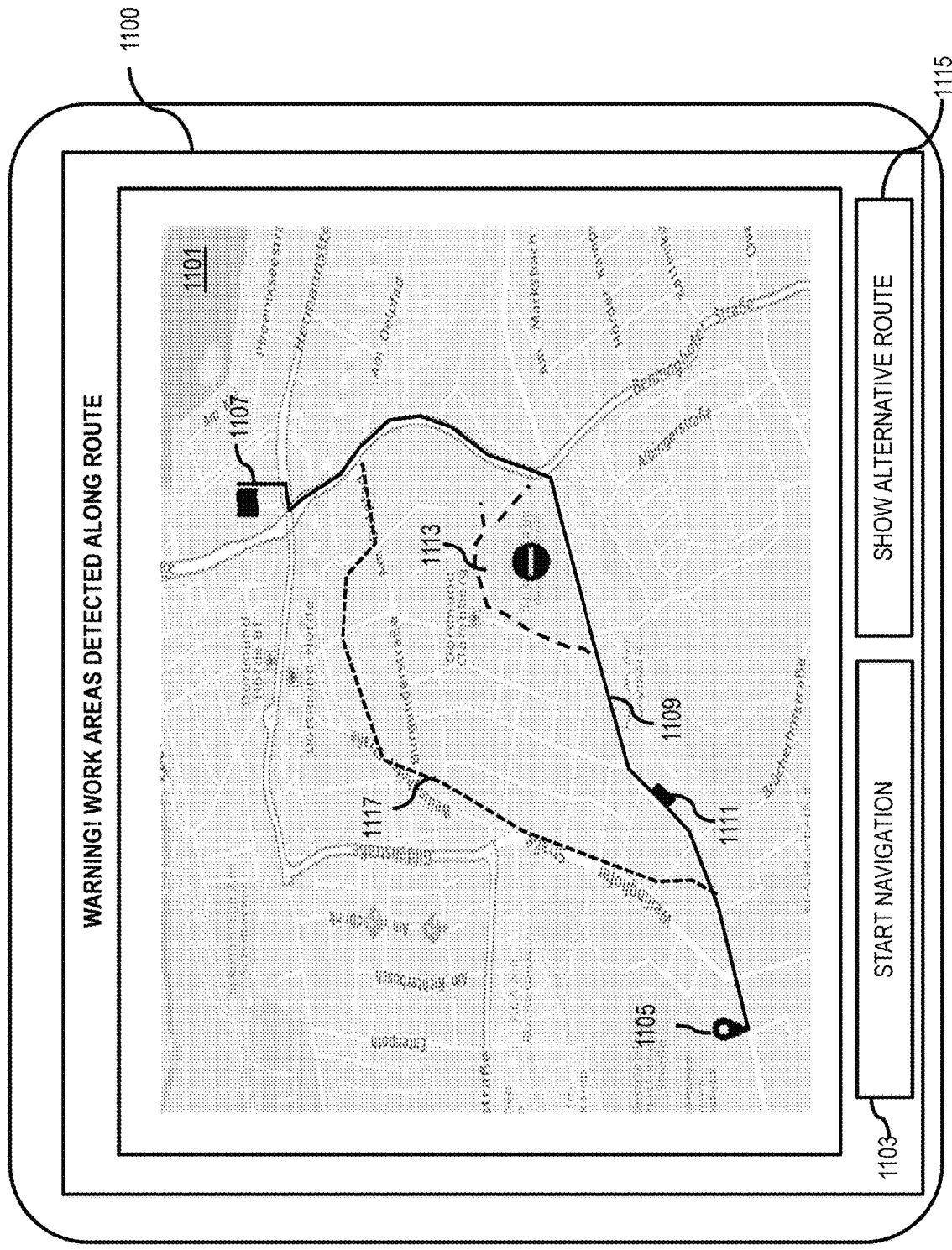
FIG. 11 is a diagram of an example user interface for navigating around special areas, according to one embodiment.

FIG. 11 is a diagram of an example user interface for navigating around special areas, according to one embodiment. In this example, a user interface (UI) 1100 (e.g., a navigation application 113) is generated for a UE 111 (e.g., a mobile device, an embedded navigation system, a client terminal, etc.) that includes a map 1101, an input 1103 of "Start Navigation" between an origin 1105 and a destination 1107. However, the system 100 determines an optimum route 1109 which nevertheless involves a mobile obstacle 1111 (e.g., a street cleaning vehicle) and a work area 1113, and shows an alert: "Warning! Work Areas Detected Along Route." In response to an input 1115 of "Show Alternative Route," the UI 1100 presents an alternative route 1117.

The above-discussed embodiments can utilize widely available probe data in map making, to create actual road geometry representation of doubly digitized roads. The above-discussed embodiments can be structured for distributed processing on cloud-based systems at all stages. The above-discussed embodiments are suitable for specialty map creation and special area detection.

Returning to FIG. 1, in one embodiment, the mapping platform 107 performs the process for creating a base map and identifying special areas as discussed with respect to the various embodiments described herein. For example, the mapping platform 107 can generate road segment related features for machine learning solutions.

In one embodiment, the mapping platform 107 has connectivity over the communications network 109 to the services platform 115 (e.g., an OEM platform) that provides the services 117a-117n (also collectively referred to herein as services 117) (e.g., probe and/or sensor data collection services). By way of example, the services 117 may also be other third-party services and include mapping services, navigation services, traffic incident services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 115 uses the output (e.g. whether a road segment is closed or not) of the mapping platform 107 to provide services such as navigation, mapping, other location-based services, etc.

In one embodiment, the mapping platform 107 may be a platform with multiple interconnected components. The mapping platform 107 may include multiple servers, intelligent networking devices, computing devices, components, and corresponding software for providing parametric representations of lane lines. In addition, it is noted that the mapping platform 107 may be a separate entity of the system 100, a part of the services platform 115, a part of the one or more services 117, or included within a vehicle 103 (e.g., an embedded navigation system).

In one embodiment, content providers 119a-m may provide content or data (e.g., including road closure reports, probe data, expected vehicle volume data, etc.) to the mapping platform 107, the UEs 111, the applications 113, the services platform 115, the services 117, the probe data layer 121, the geographic database 123, and the vehicles 103. The content provided may be any type of content, such as map content, textual content, audio content, video content, image content, etc. In one embodiment, the content providers 119 may provide content regarding the expected frequency of vehicles 103 on the digital map or link as well as content that may aid in localizing a vehicle path or trajectory on a digital map or link (e.g., to assist with determining actual vehicle volumes on a road network). In one embodiment, the content providers 119 may also store content associated with the mapping platform 107, the services platform 115, the services 117, the probe data layer 121, the geographic database 123, and/or the vehicles 103. In another embodiment, the content providers 119 may manage access to a central repository of data, and offer a consistent, standard interface to data, such as a repository of the probe data layer 121 and/or the geographic database 123.

By way of example, the UEs 111 are any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that a UE 111 can support any type of interface to the user (such as "wearable" circuitry, etc.). In one embodiment, a UE 111 may be associated with a vehicle 103 (e.g., a mobile device) or be a component part of the vehicle 103 (e.g., an embedded navigation system). In one embodiment, the UEs 111 may include the mapping platform 107 to create a base map and identify special areas.

In one embodiment, as mentioned above, the vehicles 103, for instance, are part of a probe-based system for collecting probe data for detecting actual and expected vehicle volumes on a road network and/or measuring traffic conditions in a road network (e.g., free flow traffic versus a road closure). In one embodiment, each vehicle 103 is configured to report probe data as probes, which are individual data records collected at a point in time that records telemetry data for that point in time. In one embodiment, the probe ID can be permanent or valid for a certain period of time. In one embodiment, the probe ID is cycled, particularly for consumer-sourced data, to protect the privacy of the source.

In one embodiment, a probe point can include attributes such as: (1) source ID, (2) longitude, (3) latitude, (4) heading, (5) speed, and (6) time. The list of attributes is provided by way of illustration and not limitation. Accordingly, it is contemplated that any combination of these attributes or other attributes may be recorded as a probe point. For example, attributes such as altitude (e.g., for flight capable vehicles or for tracking non-flight vehicles in the altitude domain), tilt, steering angle, wiper activation, etc. can be included and reported for a probe point. In one embodiment, the vehicles 103 may include vehicle sensors 105 for reporting measuring and/or reporting attributes. The attributes can also be any attribute normally collected by an on-board diagnostic (OBD) system of the vehicle 103, and available through an interface to the OBD system (e.g., OBD II interface or other similar interface).

The probes can be reported from the vehicles 103 in real-time, in batches, continuously, or at any other frequency requested by the system 100 over, for instance, the communication network 109 for processing by the mapping platform 107. The probes also can be map matched to specific road links stored in the geographic database 123. In one embodiment, the system 100 (e.g., via the mapping platform 107) generates vehicle paths or trajectories from the observed and expected frequency of probes for an individual probe as discussed with respect to the various embodiments described herein so that the probe traces represent a travel trajectory or vehicle path of the probe through the road network.

In one embodiment, as previously stated, the vehicles 103 are configured with various sensors (e.g., vehicle sensors 105) for generating or collecting probe data, sensor data, related geographic/map data, etc. In one embodiment, the sensed data represents sensor data associated with a geographic location or coordinates at which the sensor data was collected (e.g., a latitude and longitude pair). In one embodiment, the probe data (e.g., stored in the probe data layer 121) includes location probes collected by one or more vehicle sensors 105. By way of example, the vehicle sensors 105 may include a RADAR system, a LiDAR system, global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on a steering wheel of the vehicles 103, switch sensors for determining whether one or more vehicle switches are engaged, and the like. Though depicted as automobiles, it is contemplated the vehicles 103 can be any type of vehicle manned or unmanned (e.g., cars, trucks, buses, vans, motorcycles, scooters, drones, etc.) that travels through road segments of a road network.

Other examples of sensors 105 of a vehicle 103 may include light sensors, orientation sensors augmented with height sensors and acceleration sensor (e.g., an accelerometer can measure acceleration and can be used to determine orientation of the vehicle), tilt sensors to detect the degree of incline or decline of a vehicle 103 along a path of travel, moisture sensors, pressure sensors, etc. In a further example embodiment, vehicle sensors 105 about the perimeter of a vehicle 103 may detect the relative distance of the vehicle 103 from a physical divider, a lane line of a link or roadway, the presence of other vehicles, pedestrians, traffic lights, potholes and any other objects, or a combination thereof. In one scenario, the vehicle sensors 105 may detect weather data, traffic information, or a combination thereof. In one embodiment, a vehicle 103 may include GPS or other satellite-based receivers to obtain geographic coordinates from satellites 127 for determining current location and time. Further, the location can be determined by visual odometry, triangulation systems such as A-GPS, Cell of Origin, or other location extrapolation technologies.

In one embodiment, the UEs 111 may also be configured with various sensors (not shown for illustrative convenience) for acquiring and/or generating probe data and/or sensor data associated with a vehicle 103, a driver, a passenger, other vehicles, conditions regarding the driving environment or roadway, etc. For example, such sensors may be used as GPS receivers for interacting with the one or more satellites 127 to determine and track the current speed, position, and location of a vehicle 103 travelling along a link or road segment. In addition, the sensors may gather tilt data (e.g., a degree of incline or decline of the vehicle during travel), motion data, light data, sound data, image data, weather data, temporal data and other data associated with the vehicles 103 and/or UEs 111. Still further, the sensors may detect local or transient network and/or wireless signals, such as those transmitted by nearby devices during navigation of a vehicle along a roadway (Li-Fi, near field communication (NFC)) etc.

It is noted therefore that the above described data may be transmitted via the communication network 109 as probe data (e.g., GPS probe data) according to any known wireless communication protocols. For example, each UE 111, application 113, user, and/or vehicle 103 may be assigned a unique probe identifier (probe ID) for use in reporting or transmitting the probe data collected by the vehicles 103 and/or UEs 111. In one embodiment, each vehicle 103 and/or UE 111 is configured to report probe data as probes, which are individual data records collected at a point in time that records telemetry data.

In one embodiment, the mapping platform 107 retrieves aggregated probes gathered and/or generated by the vehicle sensors 105 and/or the UEs 111 resulting from the travel of the UEs 111 and/or vehicles 103 on a road segment of a road network. In one instance, the probe data layer 121 stores a plurality of probes and/or trajectories generated by different vehicle sensors 105, UEs 111, applications 113, vehicles 103, etc. over a period while traveling in a large monitored area (e.g., a stretch of roadway where a closure incident is reported). A time sequence of probes specifies a trajectory—i.e., a path traversed by a UE 111, application 113, vehicle 103, etc. over the period. In one instance, as the time between data points increases, so does the distance and the possible routes/paths between those two points.

In one embodiment, the communication network 109 of the system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the vehicles 103, vehicle sensors 105, mapping platform 107, UEs 111, applications 113, services platform 115, services 117, content providers 119, and/or satellites 127 communicate with each other and other components of the system 100 using well known, new or still developing protocols. In this context, a protocol includes a set of rules defining how the network nodes within the communication network 109 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 12:
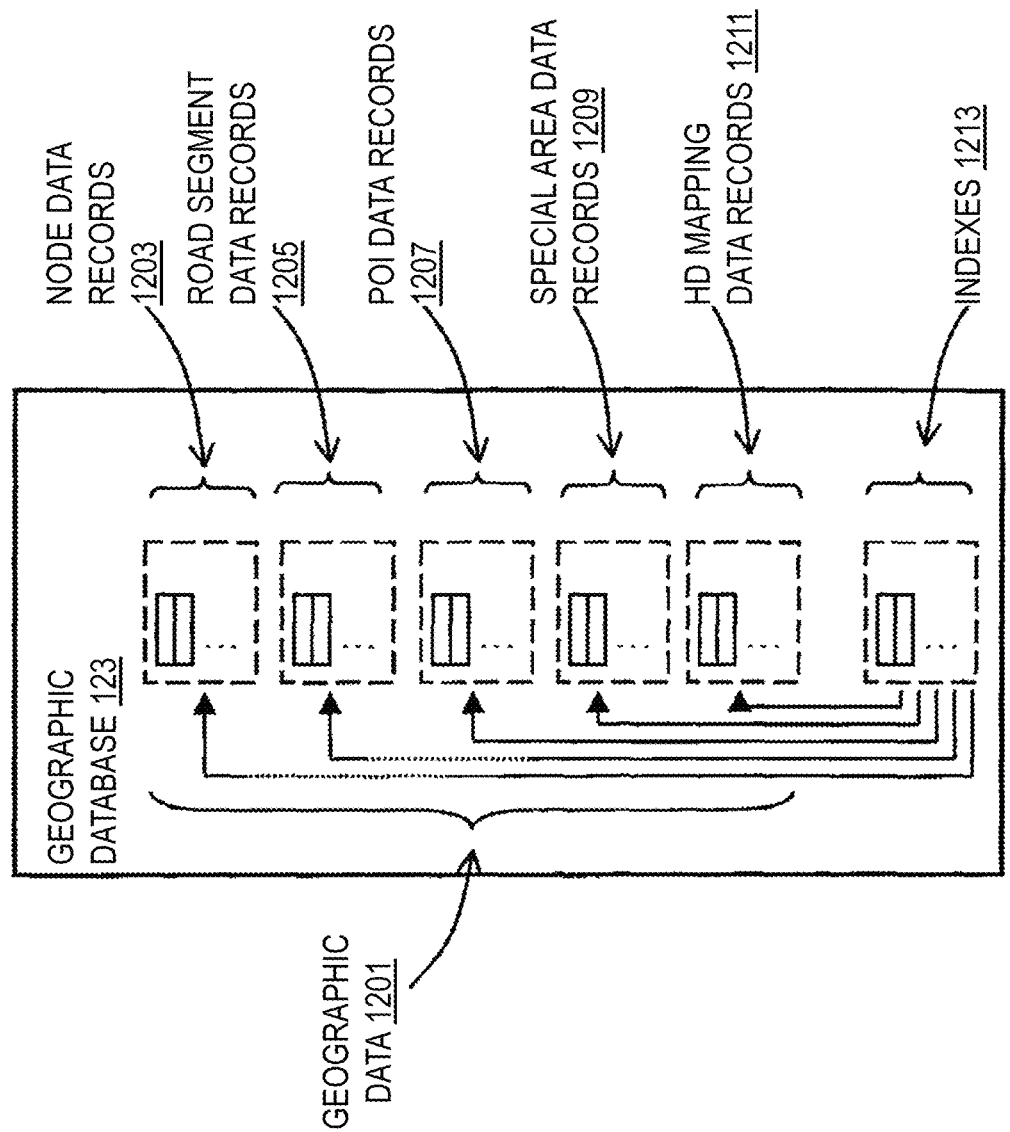
FIG. 12 is a diagram of a geographic database, according to one embodiment.

FIG. 12 is a diagram of a geographic database (such as the database 123), according to one embodiment. In one embodiment, the geographic database 123 includes geographic data 1201 used for (or configured to be compiled to be used for) mapping and/or navigation-related services, such as for video odometry based on the parametric representation of lanes include, e.g., encoding and/or decoding parametric representations into lane lines. In one embodiment, the geographic database 123 include high resolution or high definition (HD) mapping data that provide centimeter-level or better accuracy of map features. For example, the geographic database 123 can be based on Light Detection and Ranging (LiDAR) or equivalent technology to collect billions of 3D points and model road surfaces and other map features down to the number lanes and their widths. In one embodiment, the HD mapping data (e.g., HD data records 1211) capture and store details such as the slope and curvature of the road, lane markings, roadside objects such as signposts, including what the signage denotes. By way of example, the HD mapping data enable highly automated vehicles to precisely localize themselves on the road.

In one embodiment, geographic features (e.g., two-dimensional, or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 123.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 123 follows certain conventions. For example, links do not cross themselves and do not cross each other except at a node. Also, there are no duplicated shape points, nodes, or links. Two links that connect each other have a common node. In the geographic database 123, overlapping geographic features are represented by overlapping polygons. When polygons overlap, the boundary of one polygon crosses the boundary of the other polygon. In the geographic database 123, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 123 includes node data records 1203, road segment or link data records 1205, POI data records 1207, special area data records 1209, HD mapping data records 1211, and indexes 1213, for example. More, fewer, or different data records can be provided. In one embodiment, additional data records (not shown) can include cartographic ("cartel") data records, routing data, and maneuver data. In one embodiment, the indexes 1213 may improve the speed of data retrieval operations in the geographic database 123. In one embodiment, the indexes 1213 may be used to quickly locate data without having to search every row in the geographic database 123 every time it is accessed. For example, in one embodiment, the indexes 1213 can be a spatial index of the polygon points associated with stored feature polygons.

In exemplary embodiments, the road segment data records 1205 are links or segments representing roads, streets, or paths, as can be used in the calculated route or recorded route information for determination of one or more personalized routes. The node data records 1203 are end points corresponding to the respective links or segments of the road segment data records 1205. The road link data records 1205 and the node data records 1203 represent a road network, such as used by vehicles, cars, and/or other entities. Alternatively, the geographic database 123 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 123 can include data about the POIs and their respective locations in the POI data records 1207. The geographic database 123 can also include data about places, such as cities, towns, or other communities, and other geographic features, such as bodies of water, mountain ranges, etc. Such place or feature data can be part of the POI data records 1207 or can be associated with POIs or POI data records 1207 (such as a data point used for displaying or representing a position of a city).

In one embodiment, the geographic database 123 can also include special area data records 1209 for storing special area data, training data, prediction models, annotated observations, computed featured distributions, sampling probabilities, and/or any other data generated or used by the system 100 according to the various embodiments described herein. By way of example, the special area data records 1209 can be associated with one or more of the node records 1203, road segment records 1205, and/or POI data records 1207 to support localization or visual odometry based on the features stored therein and the corresponding estimated quality of the features. In this way, the records 1209 can also be associated with or used to classify the characteristics or metadata of the corresponding records 1203, 1205, and/or 1207.

In one embodiment, as discussed above, the HD mapping data records 1211 model road surfaces and other map features to centimeter-level or better accuracy. The HD mapping data records 1211 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 1211 are divided into spatial partitions of varying sizes to provide HD mapping data to vehicles 103 and other end user devices with near real-time speed without overloading the available resources of the vehicles 103 and/or devices (e.g., computational, memory, bandwidth, etc. resources).

In one embodiment, the HD mapping data records 1211 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 1211.

In one embodiment, the HD mapping data records 1211 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 123 can be maintained by the content provider 119 in association with the services platform 115 (e.g., a map developer). The map developer can collect geographic data to generate and enhance the geographic database 123. There can be different ways used by the map developer to collect data. These ways can include obtaining data from other sources, such as municipalities or respective geographic authorities. In addition, the map developer can employ field personnel to travel by vehicle (e.g., vehicles 103 and/or user terminals 111) along roads throughout the geographic region to observe features and/or record information about them, for example. Also, remote sensing, such as aerial or satellite photography, can be used.

The geographic database 123 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 103 or a user terminal 111, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for creating a base map and identifying special areas may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 13:
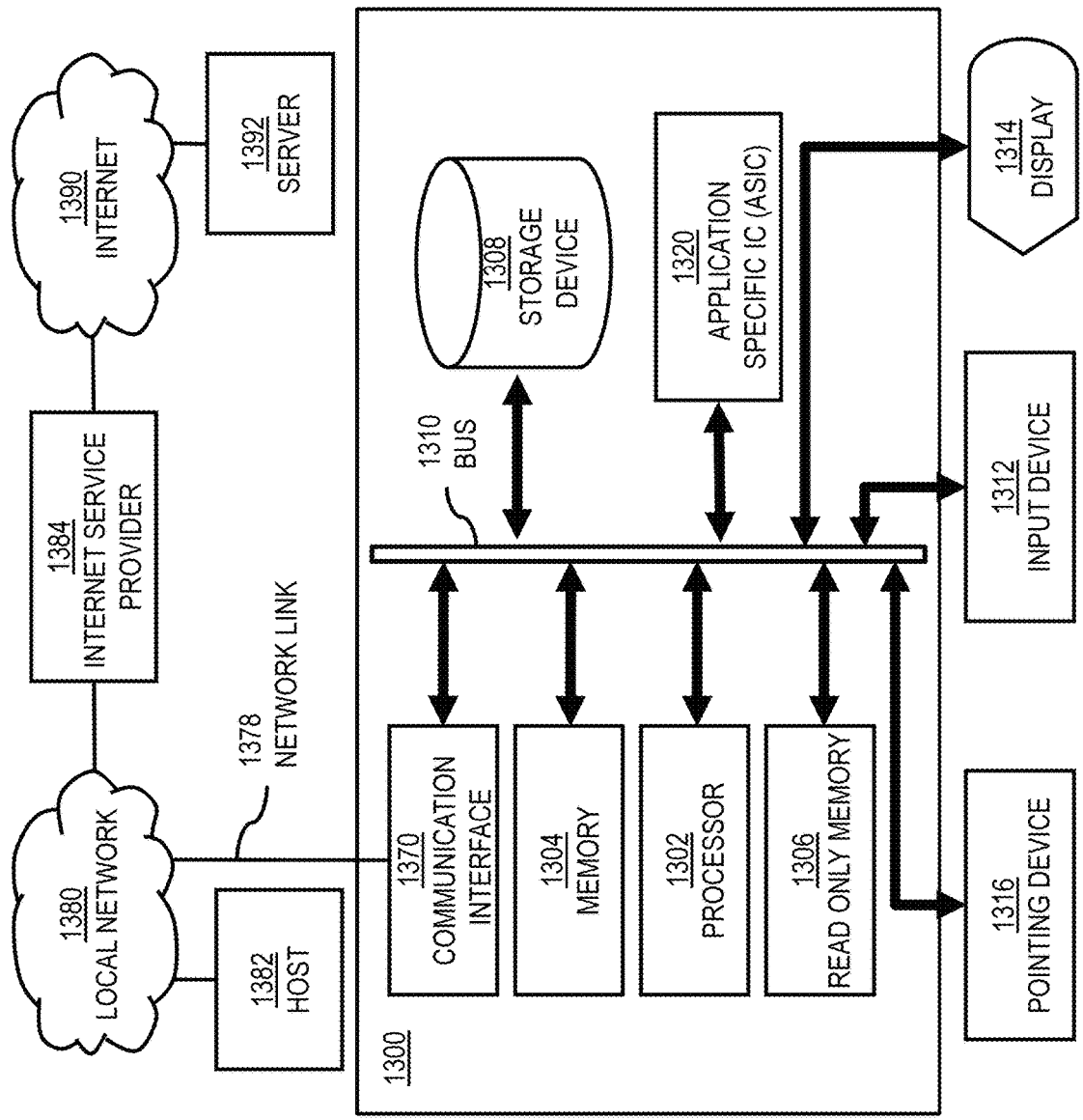
FIG. 13 is a diagram of hardware that can be used to implement an embodiment.

FIG. 13 illustrates a computer system 1300 upon which an embodiment of the invention may be implemented. Computer system 1300 is programmed (e.g., via computer program code or instructions) to create a base map and identify special areas as described herein and includes a communication mechanism such as a bus 1310 for passing information between other internal and external components of the computer system 1300. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1310 includes one or more parallel conductors of information so that information is transferred quickly among devices coupled to the bus 1310. One or more processors 1302 for processing information are coupled with the bus 1310.

A processor 1302 performs a set of operations on information as specified by computer program code related to creating a base map and identifying special areas. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1310 and placing information on the bus 1310. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1302, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1300 also includes a memory 1304 coupled to bus 1310. The memory 1304, such as a random access memory (RANI) or other dynamic storage device, stores information including processor instructions for creating a base map and identifying special areas. Dynamic memory allows information stored therein to be changed by the computer system 1300. RAM allows a unit of information stored at a location called a memory address to be stored and retrieved independently of information at neighboring addresses. The memory 1304 is also used by the processor 1302 to store temporary values during execution of processor instructions. The computer system 1300 also includes a read only memory (ROM) 1306 or other static storage device coupled to the bus 1310 for storing static information, including instructions, that is not changed by the computer system 1300. Some memory is composed of volatile storage that loses the information stored thereon when power is lost. Also coupled to bus 1310 is a non-volatile (persistent) storage device 1308, such as a magnetic disk, optical disk, or flash card, for storing information, including instructions, that persists even when the computer system 1300 is turned off or otherwise loses power.

Information, including instructions for creating a base map and identifying special areas, is provided to the bus 1310 for use by the processor from an external input device 1312, such as a keyboard containing alphanumeric keys operated by a human user, or a sensor. A sensor detects conditions in its vicinity and transforms those detections into physical expression compatible with the measurable phenomenon used to represent information in computer system 1300. Other external devices coupled to bus 1310, used primarily for interacting with humans, include a display device 1314, such as a cathode ray tube (CRT) or a liquid crystal display (LCD), or plasma screen or printer for presenting text or images, and a pointing device 1316, such as a mouse or a trackball or cursor direction keys, or motion sensor, for controlling a position of a small cursor image presented on the display 1314 and issuing commands associated with graphical elements presented on the display 1314. In some embodiments, for example, in embodiments in which the computer system 1300 performs all functions automatically without human input, one or more of external input device 1312, display device 1314 and pointing device 1316 is omitted.

In the illustrated embodiment, special purpose hardware, such as an application specific integrated circuit (ASIC) 1320, is coupled to bus 1310. The special purpose hardware is configured to perform operations not performed by processor 1302 quickly enough for special purposes. Examples of application specific ICs include graphics accelerator cards for generating images for display 1314, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1300 also includes one or more instances of a communications interface 1370 coupled to bus 1310. Communication interface 1370 provides a one-way or two-way communication coupling to a variety of external devices that operate with their own processors, such as printers, scanners, and external disks. In general the coupling is with a network link 1378 that is connected to a local network 1380 to which a variety of external devices with their own processors are connected. For example, communication interface 1370 may be a parallel port or a serial port or a universal serial bus (USB) port on a personal computer. In some embodiments, communications interface 1370 is an integrated services digital network (ISDN) card or a digital subscriber line (DSL) card or a telephone modem that provides an information communication connection to a corresponding type of telephone line. In some embodiments, a communication interface 1370 is a cable modem that converts signals on bus 1310 into signals for a communication connection over a coaxial cable or into optical signals for a communication connection over a fiber optic cable. As another example, communications interface 1370 may be a local area network (LAN) card to provide a data communication connection to a compatible LAN, such as Ethernet. Wireless links may also be implemented. For wireless links, the communications interface 1370 sends or receives or both sends and receives electrical, acoustic, or electromagnetic signals, including infrared and optical signals, that carry information streams, such as digital data. For example, in wireless handheld devices, such as mobile telephones like cell phones, the communications interface 1370 includes a radio band electromagnetic transmitter and receiver called a radio transceiver. In certain embodiments, the communications interface 1370 enables connection the vehicle 103 to the communication network 109 for creating a base map and identifying special areas.

The term computer-readable medium is used herein to refer to any medium that participates in providing information to processor 1302, including instructions for execution. Such a medium may take many forms, including, but not limited to, non-volatile media, volatile media, and transmission media. Non-volatile media include, for example, optical or magnetic disks, such as storage device 1308. Volatile media include, for example, dynamic memory 1304. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1378 typically provides information communication using transmission media through one or more networks to other devices that use or process the information. For example, network link 1378 may provide a connection through local network 1380 to a host computer 1382 or to equipment 1384 operated by an Internet Service Provider (ISP). ISP equipment 1384 in turn provides data communication services through the public, world-wide packet-switching communication network of networks now commonly referred to as the Internet 1390.

A computer called a server host 1392 connected to the Internet hosts a process that provides a service in response to information received over the Internet. For example, server host 1392 hosts a process that provides information representing video data for presentation at display 1314. It is contemplated that the components of system can be deployed in various configurations within other computer systems, e.g., host 1382 and server 1392.

FIG. 14 illustrates a chip set 1400 upon which an embodiment of the invention may be implemented. Chip set 1400 is programmed to create a base map and identify special areas as described herein and includes, for instance, the processor and memory components described with respect to FIG. 13 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1400 includes a communication mechanism such as a bus 1401 for passing information among the components of the chip set 1400. A processor 1403 has connectivity to the bus 1401 to execute instructions and process information stored in, for example, a memory 1405. The processor 1403 may include one or more processing cores with each core configured to perform independently. A multi-core processor enables multiprocessing within a single physical package. Examples of a multi-core processor include two, four, eight, or greater numbers of processing cores. Alternatively or in addition, the processor 1403 may include one or more microprocessors configured in tandem via the bus 1401 to enable independent execution of instructions, pipelining, and multithreading. The processor 1403 may also be accompanied with one or more specialized components to perform certain processing functions and tasks such as one or more digital signal processors (DSP) 1407, or one or more application-specific integrated circuits (ASIC) 1409. A DSP 1407 typically is configured to process real-world signals (e.g., sound) in real time independently of the processor 1403. Similarly, an ASIC 1409 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1403 and accompanying components have connectivity to the memory 1405 via the bus 1401. The memory 1405 includes both dynamic memory (e.g., RAM, magnetic disk, writable optical disk, etc.) and static memory (e.g., ROM, CD-ROM, etc.) for storing executable instructions that when executed perform the inventive steps described herein to create a base map and identify special areas. The memory 1405 also stores the data associated with or generated by the execution of the inventive steps.

Figure 15:
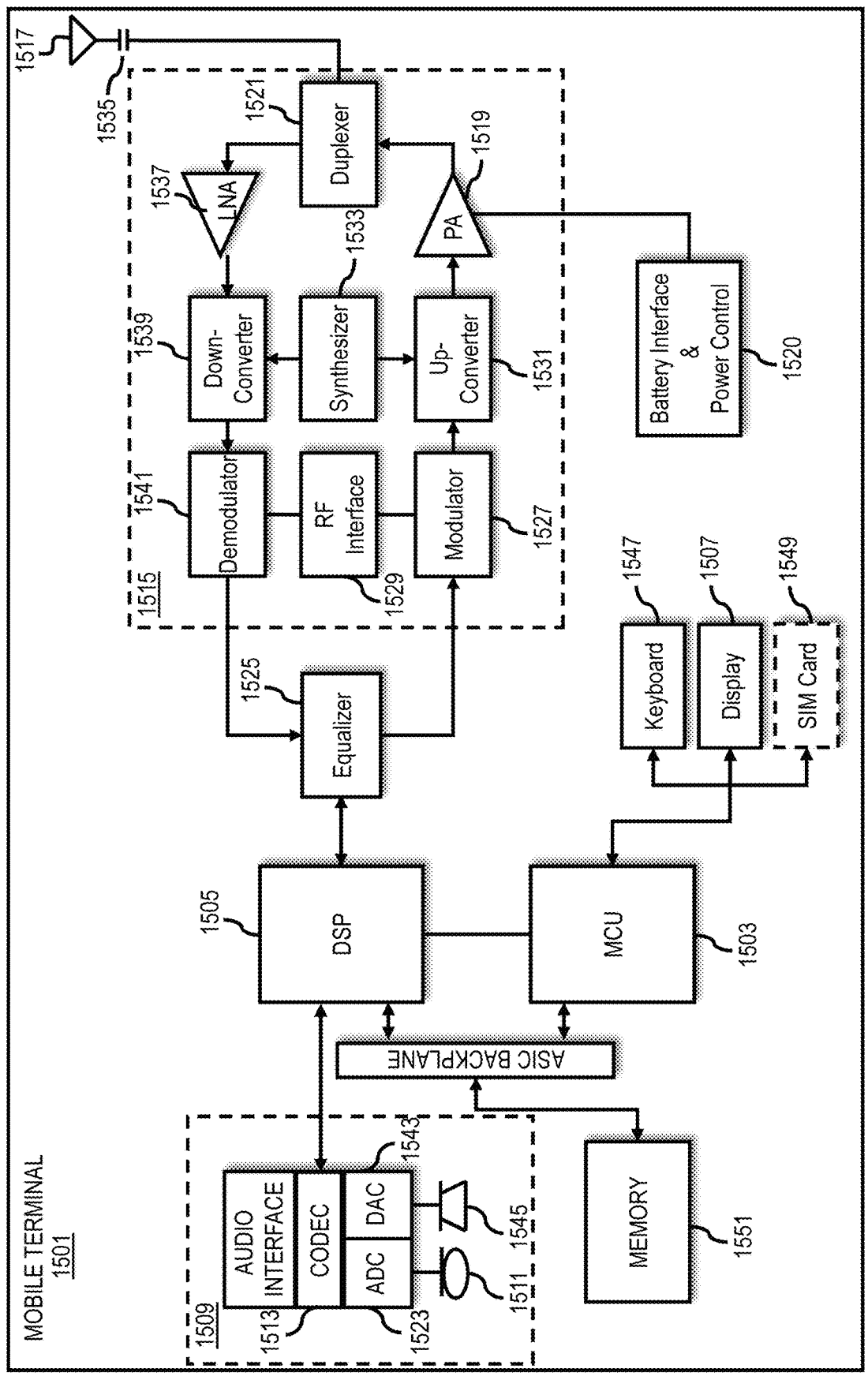
FIG. 15 is a diagram of a mobile terminal (e.g., handset or vehicle or part thereof) that can be used to implement an embodiment.

FIG. 15 is a diagram of exemplary components of a mobile terminal 1501 (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1503, a Digital Signal Processor (DSP) 1505, and a receiver/transmitter unit including a microphone gain control unit and a speaker gain control unit. A main display unit 1507 provides a display to the user in support of various applications and mobile station functions that offer automatic contact matching. An audio function circuitry 1509 includes a microphone 1511 and microphone amplifier that amplifies the speech signal output from the microphone 1511. The amplified speech signal output from the microphone 1511 is fed to a coder/decoder (CODEC) 1513.

A radio section 1515 amplifies power and converts frequency in order to communicate with a base station, which is included in a mobile communication system, via antenna 1517. The power amplifier (PA) 1519 and the transmitter/modulation circuitry are operationally responsive to the MCU 1503, with an output from the PA 1519 coupled to the duplexer 1521 or circulator or antenna switch, as known in the art. The PA 1519 also couples to a battery interface and power control unit 1520.

In use, a user of mobile station 1501 speaks into the microphone 1511 and his or her voice along with any detected background noise is converted into an analog voltage. The analog voltage is then converted into a digital signal through the Analog to Digital Converter (ADC) 1523. The control unit 1503 routes the digital signal into the DSP 1505 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1525 for compensation of any frequency-dependent impairments that occur during transmission though the air such as phase and amplitude distortion. After equalizing the bit stream, the modulator 1527 combines the signal with a RF signal generated in the RF interface 1529. The modulator 1527 generates a sine wave by way of frequency or phase modulation. In order to prepare the signal for transmission, an up-converter 1531 combines the sine wave output from the modulator 1527 with another sine wave generated by a synthesizer 1533 to achieve the desired frequency of transmission. The signal is then sent through a PA 1519 to increase the signal to an appropriate power level. In practical systems, the PA 1519 acts as a variable gain amplifier whose gain is controlled by the DSP 1505 from information received from a network base station. The signal is then filtered within the duplexer 1521 and optionally sent to an antenna coupler 1535 to match impedances to provide maximum power transfer. Finally, the signal is transmitted via antenna 1517 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1501 are received via antenna 1517 and immediately amplified by a low noise amplifier (LNA) 1537. A down-converter 1539 lowers the carrier frequency while the demodulator 1541 strips away the RF leaving only a digital bit stream. The signal then goes through the equalizer 1525 and is processed by the DSP 1505. A Digital to Analog Converter (DAC) 1543 converts the signal and the resulting output is transmitted to the user through the speaker 1545, all under control of a Main Control Unit (MCU) 1503—which can be implemented as a Central Processing Unit (CPU) (not shown).

The MCU 1503 receives various signals including input signals from the keyboard 1547. The keyboard 1547 and/or the MCU 1503 in combination with other user input components (e.g., the microphone 1511) comprise a user interface circuitry for managing user input. The MCU 1503 runs a user interface software to facilitate user control of at least some functions of the mobile station 1501 to create a base map and identify special areas. The MCU 1503 also delivers a display command and a switch command to the display 1507 and to the speech output switching controller, respectively. Further, the MCU 1503 exchanges information with the DSP 1505 and can access an optionally incorporated SIM card 1549 and a memory 1551. In addition, the MCU 1503 executes various control functions required of the station. The DSP 1505 may, depending upon the implementation, perform any of a variety of conventional digital processing functions on the voice signals. Additionally, DSP 1505 determines the background noise level of the local environment from the signals detected by microphone 1511 and sets the gain of microphone 1511 to a level selected to compensate for the natural tendency of the user of the mobile station 1501.

The CODEC 1513 includes the ADC 1523 and DAC 1543. The memory 1551 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1551 may be, but not limited to, a single memory, CD, DVD, ROM, RAM, EEPROM, optical storage, or any other non-volatile or non-transitory storage medium capable of storing digital data.

An optionally incorporated SIM card 1549 carries, for instance, information such as the cellular phone number, the carrier supplying service, subscription details, and security information. The SIM card 1549 serves primarily to identify the mobile station 1501 on a radio network. The card 1549 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    retrieving, by one or more processors, probe data collected at a point in time or during a time period from one or more sensors of one or more probe devices traveling within a geographic area including a plurality of geographic partitions each of which corresponds to a map tile;
    dividing, by the one or more processors, each of the geographic partitions into a plurality of grid cells, wherein each of the geographic partitions is processed by the one or more processors in parallel using parallelized processing;
    for each grid cell of the plurality of grid cells, detecting, by the one or more processors using the parallelized processing, one or more directional groupings of the probe data in a travel direction distribution, wherein the one or more directional groupings comprise one or more probes of the probe data that share a respective common direction of travel;
    detecting, by the one or more processors using a machine learning algorithm and the parallelized processing, a set of grid cells with a count of the one or more directional groupings that is above a count threshold;
    designating, by the one or more processors using the parallelized processing, an area associated with the set of grid cells as an unconstrained area or a sub-area of the unconstrained area that exists at the point in time or during the time period, wherein the unconstrained area is an area in which travel is random without being constrained to a road network; and
    providing, by the one or more processors, the unconstrained area, the sub-area, or a combination thereof as a mapping data output.

2. The method of claim 1, wherein the set of grid cells is detected as a continuous region of the plurality of grid cells with the count above the count threshold.

3. The method of claim 1, wherein the unconstrained area includes a work area, a loading/unloading zone, a mine site, a construction area, a warehousing area, a parking area, or a combination thereof.

4. The method of claim 1, further comprising:
    excluding the unconstrained area from a map making process.

5. The method of claim 1, further comprising:
    monitoring the count of the one or more direction groupings of the set of grid cells over a subsequent time period; and
    determining an evolution of the unconstrained area over the subsequent time period based on the monitoring.

6. The method of claim 5, further comprising:
    determining a temporary or permanent road obstruction in the unconstrained area based on the evolution of the unconstrained area over the subsequent time period.

7. The method of claim 1, further comprising:
    representing the unconstrained area as a geometrical envelope; and
    navigating one or more vehicles in, around, or a combination thereof the unconstrained area.

8. The method of claim 7, wherein the geometrical envelope is created based on a concave or convex polygon envelope with a buffer, the concave or convex polygon envelope without a buffer, a density estimated based on one or more kernels, a boundary threshold, or a combination thereof.

9. The method of claim 1, further comprising:
    filtering an intersection area from the unconstrained area based on a clustering score.

10. The method of claim 9, wherein the clustering score is based on a participating cell count.

11. The method of claim 9, wherein the cluster score is based on probe speed information, a detection of direction reversal, a detection of parking brake engagement, a detection of a neutral or park gear selection, a detection of a loading or unloading event, or a combination thereof.

12. The method of claim 1, further comprising:
    determining density of road link nodes detected from the probe data for said each grid cell; and
    detecting the set of grid cells based on the density of the road link nodes.

13. The method of claim 1, further comprising:
    detected a road in the unconstrained area based on a stability of one or more detected paths over time, a high frequency of drives relative to other paths in the unconstrained area, a connectivity to a road outside of the unconstrained area, or a combination thereof.

14. The method of claim 1, further comprising:
determining elevation data associated with the probe data, wherein the one or more directional groupings, the set of grid cells, the unconstrained area, or a combination thereof is further based on the elevation data.

15. An apparatus comprising:
at least one processor; and
at least one memory including computer program code for one or more programs,
the at least one memory and the computer program code configured to, with the at least one processor, cause the apparatus to perform at least the following,
retrieve probe data collected at a point in time or during a time period from one or more sensors of one or more probe devices traveling within a geographic area including a plurality of geographic partitions each of which corresponds to a map tile;
divide each of the geographic partitions into a plurality of grid cells, wherein each of the geographic partitions is processed in parallel using parallelized processing;
for each grid cell of the plurality of grid cells, detect, using the parallelized processing, one or more directional groupings of the probe data in a travel direction distribution, wherein the one or more directional groupings comprise one or more probes of the probe data that share a respective common direction of travel;
detect, using a machine learning algorithm and the parallelized processing, a set of grid cells with a count of the one or more directional groupings that is above a count threshold;
designate, using the parallelized processing, an area associated with the set of grid cells as an unconstrained area or a sub-area of the unconstrained area that exists at the point in time or during the time period, wherein the unconstrained area is an area in which travel is random without being constrained to a road network; and
provide the unconstrained area, the sub-area, or a combination thereof as a mapping data output.

16. The apparatus of claim 15, wherein the set of grid cells is detected as a continuous region of the plurality of grid cells with the count above the count threshold.

17. The apparatus of claim 15, wherein the unconstrained area includes a work area, a loading/unloading zone, a mine site, a construction area, a warehousing area, a parking area, or a combination thereof.

18. A non-transitory computer-readable storage medium carrying one or more sequences of one or more instructions which, when executed by one or more processors, cause an apparatus to perform:
retrieving probe data collected at a point in time or during a time period from one or more sensors of one or more probe devices traveling within a geographic area including a plurality of geographic partitions each of which corresponds to a map tile;
dividing each of the geographic partitions into a plurality of grid cells, wherein each of the geographic partitions is processed in parallel using parallelized processing;
for each grid cell of the plurality of grid cells, detecting, using the parallelized processing, one or more directional groupings of the probe data in a travel direction distribution, wherein the one or more directional groupings comprise one or more probes of the probe data that share a respective common direction of travel;
detecting, using a machine learning algorithm and the parallelized processing, a set of grid cells with a count of the one or more directional groupings that is above a count threshold;
designating, using the parallelized processing, an area associated with the set of grid cells as an unconstrained area or a sub-area of the unconstrained area that exists at the point in time or during the time period, wherein the unconstrained area is an area in which travel is random without being constrained to a road network; and
providing the unconstrained area, the sub-area, or a combination thereof as a mapping data output.

19. The non-transitory computer-readable storage medium of claim 18, wherein the set of grid cells is detected as a continuous region of the plurality of grid cells with the count above the count threshold.

20. The non-transitory computer-readable storage medium of claim 18, wherein the unconstrained area includes a work area, a loading/unloading zone, a mine site, a construction area, a warehousing area, a parking area, or a combination thereof.

* * * * *